(12) United States Patent  (10) Patent No.: US 7,143,082 B2
Kamimura et al.  (45) Date of Patent: Nov. 28, 2006

(54) DISTRIBUTED-PROCESSING DATABASE-MANAGEMENT SYSTEM

(75) Inventors: Shuichi Kamimura, Tokyo (JP); Mutsumi Fujihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 492 days.

(21) Appl. No.: 10/109,640

(22) Filed: Apr. 1, 2002

(65) Prior Publication Data

US 2002/0184198 A1 Dec. 5, 2002

(30) Foreign Application Priority Data

Mar. 30, 2001 (JP) ............................ 2001-101738

(51) Int. Cl.
G06F 7/00 (2006.01)
G06F 17/30 (2006.01)
G06F 12/00 (2006.01)

(52) U.S. Cl. .................. 707/3; 707/200; 707/201; 707/202; 707/203; 707/204

(58) Field of Classification Search ................ 707/204, 707/200, 202
See application file for complete search history.

(56) References Cited

U.S. PATENT DOCUMENTS

| | | | |
|---|---|---|---|
| 5,832,514 A | 11/1998 | Norin et al. | |
| 5,913,219 A * | 6/1999 | Baek et al. | 707/202 |
| 5,987,506 A | 11/1999 | Carter et al. | |
| 6,012,059 A | 1/2000 | Neimat et al. | |
| 6,018,746 A * | 1/2000 | Hill et al. | 707/202 |
| 6,182,198 B1 * | 1/2001 | Hubis et al. | 711/162 |
| 6,243,825 B1 * | 6/2001 | Gamache et al. | 714/4 |
| 6,349,306 B1 * | 2/2002 | Malik et al. | 707/103 R |
| 6,393,485 B1 * | 5/2002 | Chao et al. | 709/231 |
| 6,438,563 B1 * | 8/2002 | Kawagoe | 707/201 |
| 6,532,491 B1 * | 3/2003 | Lakis et al. | 709/223 |
| 6,671,704 B1 * | 12/2003 | Gondi et al. | 707/204 |
| 6,691,245 B1 * | 2/2004 | DeKoning | 714/6 |
| 6,795,830 B1 * | 9/2004 | Banerjee et al. | 707/200 |
| 6,898,609 B1 * | 5/2005 | Kerwin | 707/203 |
| 2002/0049845 A1 * | 4/2002 | Sreenivasan et al. | 709/226 |

* cited by examiner

*Primary Examiner*—Frantz Coby
*Assistant Examiner*—Cindy Nguyen
(74) *Attorney, Agent, or Firm*—Oblon, Spivak, McClelland, Maier & Neustadt, P.C.

(57) ABSTRACT

A database-management system easy for system integration and flexible to functional modifications, etc., is provided. A database stored in each main-memory area of a plurality of computers connected via network is managed as follows: a first computer storing original data of at least a piece of data of the database is designated as a base host. At least one second computer storing replica data of the original data is designated as a replica host. A retrieving procedure is performed to receive data to be stored in a third computer from the base host storing the original data or the replica host storing the replica data in startup of the third computer, and store the received data in the main-memory of the third computer.

15 Claims, 11 Drawing Sheets

DISTRIBUTED-PROCESSING DATABASE-MANAGEMENT SYSTEM

CROSS REFERENCE TO RELATED APPLICATIONS

This application claims benefit of priority under 35USC §119 to Japanese Patent Application No. 2001-101738 filed on Mar. 30, 2001 in Japan, the entire contents of which are incorporated by reference herein.

BACKGROUND OF THE INVENTION

The present invention relates to a database system constructed on a computer main-memory area. Particularly, this invention relates to a distributed data-processing database-management system constructed on the Internet or intranets, with a database-managing function and also other several functions such as transaction management and distributed system-administration for backups, recovery from faults and load distribution.

Database systems for real-time monitoring and controlling of data shared by computers distributed over a network have to process (search and update) a huge amount of data at a high speed. Such database performance thus depends on data-management systems that provide a means of accessing those data. Enhanced data-management systems could manage all data on a main-memory area, which are usually stored on an external storage device such as a hard disk. Increased storage capacity for main memories has allowed all data to remain in a main-memory area as resident data even in the present hardware environments.

Mere caching of a data-managing system on a main-memory area to known external storage devices cannot achieve high performance for real-time applications. There are two reasons for such a drawback: (a) a huge amount of data has to be transferred between an application and a data-managing system; and (b) execution of algorisms designed for external storage devices on a main-memory area of each computer cannot achieve high performance. In addition, limited functions of such algorisms designed for external storage devices and provided by a data-managing system cannot lighten loads for development of applications, nonetheless achieving high-speed processing a little bit.

There are a lot of demands for high reliability on systems running 24 hours for 365 days. These systems mostly have a redundant structure because system down is not allowed for them no matter what happens. Middleware (MA) and hardware (HW) that support such highly reliable functions have to be controlled by application software. This requires achievement of such highly reliable functions and also accessibility to data structure, which results in low application quality due to application complexity with bugs to a highly reliable redundant structure. Development thus has been waited for easy database-managing system settings and also highly-reliable data-managing functions.

As discussed above, known database systems are not sufficient for speed, reliability and function. In detail, these systems have the following drawbacks:

(1) System Halt due to Functional Alteration

Initial data structure could not follow functional alterations or extension required during system development. Such requirements are met by database alterations, which however bring a system to a halt. Functional alterations under system halt after the system has run will cost very much. System halt for functional alterations means low maintenance performance.

(2) Difficulty in Structure Alteration

Functional alterations or extension will be required often during system life cycle. Initial data structure may not follow newly added functions which have not been expected in system design. Such added functions are made effective by database alterations which, however, often result in complex data structure. Such complex data structure could cause low maintenance performance, low productivity and low performance.

(3) Low Productivity in Development of Large-Scale System

Development of large-scale systems requires many applications engineers at one time. Data structures are often designed so that each structure can be shared by several applications without consideration to each application characteristics, thus data structures becoming unfriendly to applications engineers. In addition, development of large-scale systems suffers low productivity due to unnecessary processing such as returning to former stages because of no development tools with data-structure developing techniques for large-scale systems.

(4) Difficulty in Local/Remote Procedure

Known database-management systems require RPC (Remote Procedure Call) for any procedures (transactions) to remote machines, which however takes time compared to usual execution of applications due to change in application procedure for transactions to remote computers.

SUMMARY OF THE INVENTION

In order to solve the problems discussed above, a purpose of the present invention is to provide a distributed-processing database-management system with easy system construction, flexible to functional alterations.

A basic requirement for distributed-processing database-management systems is that the identical databases exist at several sites. Such basic requirement is met in the present invention by a function called "retriever" in which a portion of (or all) data stored in a database already existing at a site is copied to other sites running now from a halt so that the latter sites can belong to a system including the former site.

This method allows addition of sites (databases) to a system without brining the entire system to a halt. In addition, data are taken from available sites among several sites appointed as "retriever"-requested sites. A system manager (user) can therefore enhance a system by adding new sites (up-to-date data).

Information on sites to be appointed as "retriever"-requested sites can be set or altered in this metho8d regardless of whether or not the appointed sites have already been included in a system and also without bringing the system to a halt.

Therefore, this method allows sites that have not been included in a system to be newly added and also achieves accurate control of initial-data loading for enhancing (any time) on-line system.

A method of managing a database stored in each main-memory area of a plurality of computers connected via network, according to an embodiment of the present invention, includes: designating a first computer storing original data of at least a piece of data of the database as a base host; designating a second computer storing replica data of the original data as a replica host; and performing a retrieving procedure to receive data to be stored in a third computer from the base host storing the original data or the replica host storing the replica data in startup of the third computer, and store the received data in the main-memory of the third computer.

In a computer readable medium containing an executable program for managing databases, according to an embodiment of the present invention, the program has instructions for: designating a first computer storing original data of at least a piece of data of a database stored in each main-memory area of a plurality of computers connected via network, as a base host; designating a second computer storing replica data of the original data as a replica host; and performing a retrieving procedure to receive data to be stored in a third computer from the base host storing the original data or the replica host storing the replica data in startup of the third computer, and store the received data in the main-memory of the third computer.

A database-management system comprising at least two computers connected via a network, the computers having main-memory areas storing databases, each database having at least a piece of data, either of the computers being designated as an original site for storing the original of the data, the other computer being designated as a replica site for storing replica of the data, according to an embodiment of the present invention, each computer including: a data resident-status setter configured to set a list of at least one computer at which the data is to be resident, the base host storing the original data of the data, and at least one host to which the computer at which the data is to be resident makes a request for a retrieving procedure; and a retrieved-data manager configured to transmit the request to the one host in accordance with the setting performed by the data-resident status setter, the data being transmitted to the computer that is making the request from the base host or the replica host by the retrieving procedure.

DETAILED DESCRIPTION OF EMBODIMENTS

Embodiments according to the present invention will be disclosed with reference to the attached drawings.

In the present invention, data processing included in the several embodiments disclosed later is achieved by software running on a computer. Such software makes computer hardware active to fulfill the purposes of the present invention. Several known techniques are included in the present invention. The embodiment will be disclosed with reference to circuit blocks representing several functions achieved by hardware or software which are changeable.

[1. Overall Picture of Distributed Data-Management System]

The present invention relates a distributed data-management system for adequately and efficiently managing databases provided on several machines connected via a network.

A distributed data-management system (called the present system hereinafter) according to an embodiment of the present invention is explained briefly before the detail disclosure.

The present system handles databases (lexicon sets) and transactions. In detail, the present system receives requests for operations such as database looking-up, searching and updating as transactions from applications (users) and executes the transactions with no faults, and also sends notifications of execution completed and results of execution to the applications.

Figure 1:
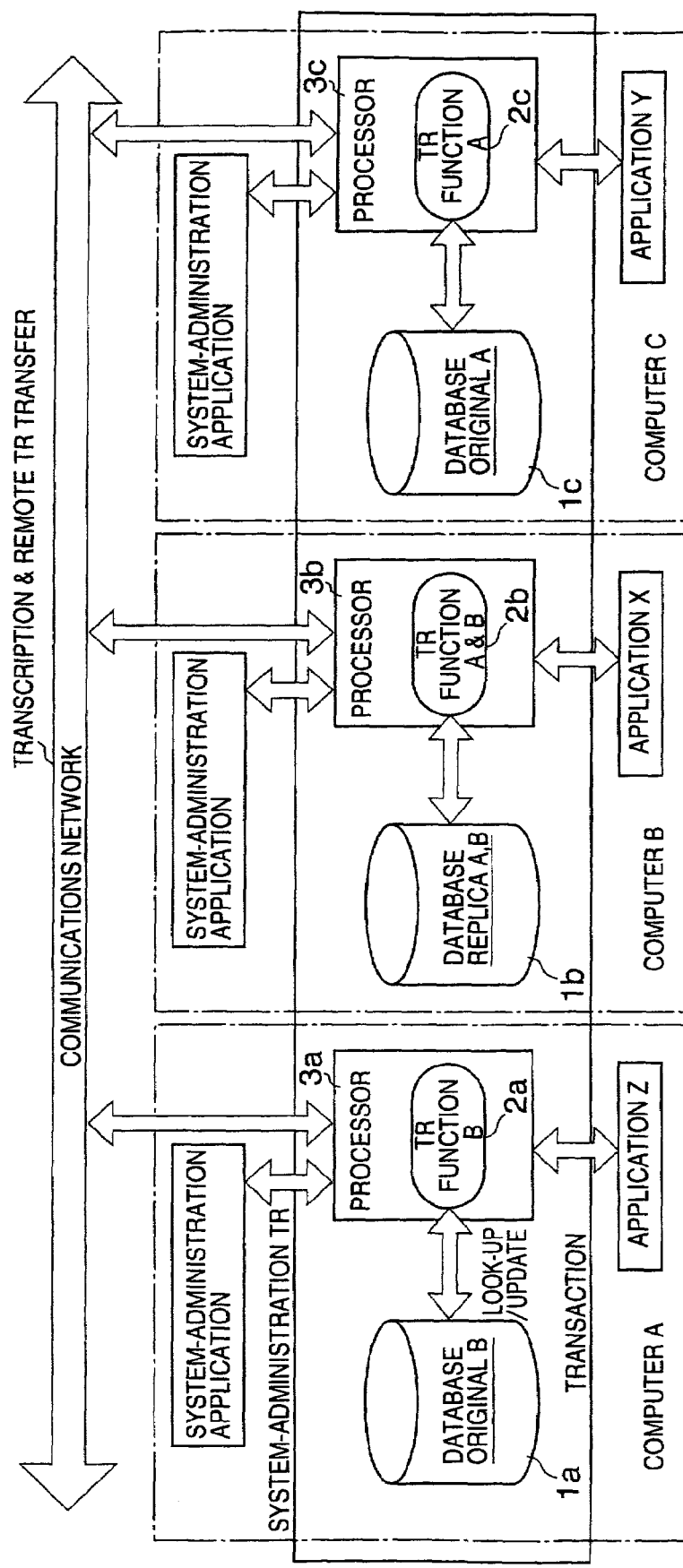
FIG. 1 shows a functional block diagram indicating the overall configuration of a distributed-processing database-management system according to embodiments of the present invention.

FIG. 1 shows the configuration of a distributed-processing database-management system according to embodiments of the present invention.

The present system includes several computers A, B, C, . . . (each being called a host), as shown in FIG. 1, connected via a communications network. Provided in main-memory areas of the hosts A, B and C are databases 1a, 1b and 1c, respectively, and also transaction (TR) functions 2a, 2b and 2c, respectively, used for accessing the corresponding databases.

One or more of applications will run on each host. However, different applications will mostly run on hosts when the present system includes several hosts. In detail, each of applications X, Y and Z provided outside the present system accesses the database of the corresponding host for necessary processing. More precisely, each of the applications X, Y and Z requests the corresponding transaction function 2a, 2b or 2c pre-registered in the present system via the corresponding processor 3a, 3b or 3c for procedures such as looking-up and updating. On receiving the processing results, each application performs a necessary procedure for execution of programs in addition to accessing the corresponding database. Usually, the applications X, Y and Z perform front-end procedure such as displaying on monitor screen and printing.

(Database)

Figure 2:
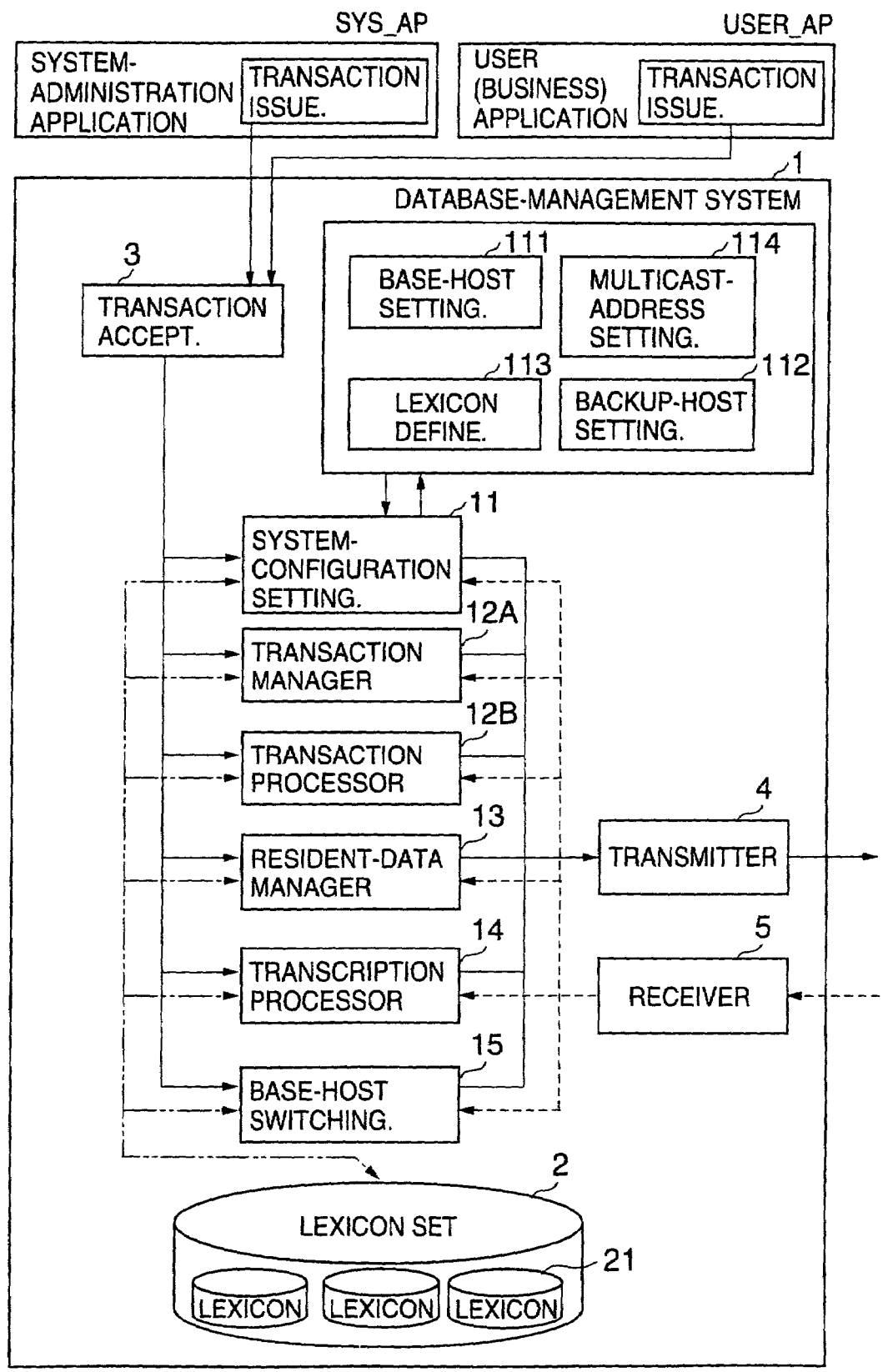
FIG. 2 shows a block diagram indicating the configuration of each host in the distributed-processing database-management system shown in FIG. 1.

Each of the databases 1a, 1b and 1c in the present system includes one or more of lexicons. A lexicon is a unit for selective accessing data in a lexicon set or giving attributes to the data. Lexicons are discriminated from each other by their (lexicon) names. Lexicon sets are also discriminated from each other by their (lexicon-set) names because a uni-space can contain several lexicon sets, as shown in FIG. 2, in the environment for executing the present system. Several uni-spaces are also discriminated from each other by their (uni-space) names because the present system can be structured as several systems for managing several uni-spaces, or several different lexicon sets, via a common network on a physical machine.

The original data of a lexicon set is stored in the database of one of several hosts in the network and its replica data are stored at the other hosts. For example, in FIG. 1, the original data for data B has been stored at the host A (computer A), and that for data A has been stored at the host C (computer C). The replica data for the data A and B have been stored at the host B (computer B). The data-updating procedure can be allowed to the original data only, not to the replica data in the present system.

(Transaction)

An abstracted/generalized procedure for operations to be performed by a transaction is called a "transaction function". Transaction functions (TR functions) A and B shown in FIG. 1 are used to access the database of the corresponding machine for realization of a necessary procedure shared by the applications X, Y and Z. In other words, the applications X, Y and Z do not directly access the corresponding databases but via the corresponding transaction functions in the present system.

A transaction includes identifiers (such as a transaction name) for giving data several types of attributes. A transaction function to be executed may be set so that it corresponds to the identifiers. A necessary number of identifiers can be prepared in accordance with the types of attributes to be given.

A transaction can handle only one lexicon set in the present invention. A uni-space can include several lexicon sets, so that a lexicon-set name to be operated is stated in a transaction. The lexicon-set name may be one of the identifiers. Statement of a lexicon-set name in a transaction is not a must because a lexicon set to be operated can be found by using another identifier.

The present system processes a data-operation request from an application per transaction. The updating procedure to the original data is also executed per updating TR. Moreover, a necessary procedure to the replica data is executed at a replica site per original updating TR so that the replica data can reflect changes in the original data due to the updating procedure with the function called "retriever", which will be explained later.

(Major Purpose of the Present System)

The major purpose of the present system is to maintain databases (lexicon sets) as containing identical contents over several machines. In detail, several machines hold duplicates of a database, and when a database at one machine has been updated, the updated information (the contents of updating) is transmitted to the other machines via a communications network so that the databases at the other machines can reflect the updating, to fulfill the purpose. This function is called "transcription" in the present invention. Data transmitted by the function "transcription" is called "transcribed" data in the present invention.

A machine that is authorized to update a database is called an original site for the database and data in the database is called an original data in the present invention. Other machines that hold duplicates of that database are called replica sites and data in each duplicate of the database is called replica data in the present invention.

The present system executes a transaction (updating TR) for updating a database at the original site. With the function "transcription", the system further handles several duplicate databases as logically seen as one database from the application of each machine. The application of each machine therefore does not need to know about which machine is the original site. This system configuration is called "remote/local architecture" in the present invention.

In the present system, until a unit of execution of a transaction and a necessary procedure to replica data so that it can reflect changes in "transcribed" data has been completed for a database (lexicon set), another transaction procedure (and also a procedure on another "transcribed" data) for the database will not be executed. In other words, another transaction procedure and a procedure on another "transcribed" data have to wait for the completion of all the execution described above.

In other words, a transaction procedure and a procedure on "transcribed" data for one database (lexicon set) of one machine are serially executed per transaction. Therefore, an application that has requested a transaction will not access a database to which another transaction is running.

A transaction for data searching and looking-up only with no updating procedure is called a looking-up transaction in relation to an updating transaction. The function "transcription" in the present system achieves quick matching between original data and replica data per transaction. This allows a look-up transaction to operate the replica data of a machine (local machine) that has been requested for the transaction.

The communications network in the present system is a means of achieving the function "transcription" in which an original site transmits "transcribed" data to replica sites. It is also a means of transmitting an updating transaction issued (requested) at a replica site to the original site. The function of executing the updating transaction at an original site is achieved by transmitting the updating transaction issued at a replica site to the original site via the communications network.

[Definition of Technical Terms]

Meaning of several technical terms used in this specification will be explained before disclosure of the embodiment.

(1) Uni-Space (Shared Unit Area/Database-Running Unit Area)

The present system runs over several machines (hosts) connected via a network for maintaining and updating data shared by main memories of the several machines. The term "uni-space" in the present system is an identifier for discriminating data from each other shared by the several machines of the present system and also discriminating data-access (looking up, updating) services from each other. The identifier is used for discrimination of server groups in which servers communicate with each other. It is also used when an application requests a server for a service to access data shared by several servers. The identifier "uni-space" is constituted by several ASCII characters and a set of IP multicast addresses used for group-to-group communications.

(2) Lexicon Set

A subset of uni-space data shared by several databases is called a lexicon set. It is possible to decide whether or not to provide data per lexicon set to machines, each constituting a main-memory area. The present system is capable of storing main-memory data into files as backup data per lexicon set.

A lexicon set has an indexing function for high-speed accessing to data (called shared data hereinafter). Listed below are basic data-structures for a lexicon set.

(a) LEXICON: a subset of a lexicon set, belonging to a lexicon set;

(b) CELL: data-storing array, having attributes of type (data type), capacity (length of alignment) and count (effective length as a key for sorting), belonging to a lexicon set;

(c) CONTEXT: data (CELL array) for giving CELLs a linear relation, having an attribute of capacity, belonging to a lexicon set;

(d) ROW: data for appointing a sort key for a part of CONTEXT, having attributes of row length and key length, belonging to a lexicon set; and (e) FACADE: data for sorting ROW for data searching, a main element for the indexing function, belonging to a lexicon set.

(3) Transaction

Transaction is a function of looking-up and updating shared data when receiving a request from an application belonging to a uni-space service. A set of data operated by a transaction at once is one lexicon set only. For updating shared data by using transactions in the present system, data-updating is executed at a specific site (called a base host or an original site hereinafter) at which an original data exits, and then the updated results ("transcribed" data) are multicast to other sites belonging to a uni-space for the specific site for maintaining data consistency. The base site can be appointed per lexicon set.

Transactions issued by applications are classified into (a) local looking-up, (b) local updating and (c) remote updating, in the present invention.

(a) Local Looking-Up

This transaction operation is allowed only look up shared data, executed as accessing to completely local main-memory data, with no network traffic. In other words, data is only looked up by this transaction with no updating so that access is made always to main-memory data of the self-site to which the transaction has been issued regardless of the self-site being an original site or a replica site.

(b) Local Updating

This is for an original site at which an application has issued a transaction. This function allows the original site to update data, and then to multicast the updated data to other sites so that several hosts can always use the identical data.

(c) Remote Updating

This is for each replica site at which an application has issued a transaction. This function does not allow the replica site to update data directly because it is a replica data. The transaction is transmitted to an original site for data updating. "Transcribed" data is transmitted by the function "transcription" so that every host can always use the identical data. Replica sites with no such application that has issued this transaction can receive "transcribed" data from the original site. This allows every host to always use the identical data.

Discrimination between (b) local updating and (c) remote updating depends on whether a base host is a site to receive a transaction. The halt timing for (b) local updating is at a moment of local main-memory data-updating. The halt timing for (c) remote updating is at a moment at which local data reflects the updating in "transcribed" data received after common data has been updated with transmission of a transaction to a base host.

Discrimination between (b) local updating and (c) remote updating is made in the present system with no relation to applications.

(4) Retriever

"Retriever" is a function of handling original or replica data at a host so that it makes the system available when the system has just started or lexicon-set data is stored in a main-memory area, all (original or replica) lexicon-set data being transmitted to this host from other hosts via a network. A list of hosts to which a "retriever" request will be sent can be provided. A "retriever" request is sent to hosts on the list in accordance with a predetermined protocol. A list can be decided in accordance with original- and replica-host allocation, network bandwidth and machine specification, etc., for adequate settings to the system configuration.

Data is usually provided to each host via a network, however, it can be loaded from files when the system has just started in case of failure of "retriever" from the network, and it can also be loaded from files before "retriever" from the network.

(5) Transcription

"Transcription" is a function of transmitting data updated by updating transaction to other machines from a specific machine by multicasting. In detail, an updating transaction is executed at an original host and only the updated data are transmitted to replica hosts by multicasting. On receiving the updated data, the replica hosts perform a necessary procedure so that replica data can reflect the updating.

(6) Backup

A backup function is to store the contents of lexicon set in secondary storage devices. The backup function to secondary storage devices can be set as an option (which can be set anytime), so that the system configuration can be modified in accordance with required throughput and reliability. The data stored by the backup function will be used for system startup or recovery from faults. The backup function to secondary storage devices is executed asynchronous with transaction procedure for high-speed main-memory data management with no decrease in transaction throughput.

(7) Technical Terms for Sites in Network

Local site: self-site

Remote site: other sites

Original site: a site holding original data

Replica site: sites holding replica (duplicate) data

[3. Host Architecture . . . FIG. 2]

Disclosed next is the architecture of each host with reference to FIG. 2.

A database-management apparatus 1 is provided in the main-memory area of each host. The management apparatus 1 is equipped with several processing and setting sections and a database called a lexicon set 2 for achieving these processing and settings. It is also equipped with a transaction-accepting section 3 which is a contact point or reception for system administration and business applications, and also a transmitter 4 and a receiver 5 for connecting each host to a network.

The management apparatus 1 is provided with several processing and setting sections as follows:

(1) System-Configuration Setting Section 11

The system-configuration setting section 11 has a base-host setting section 111, a backup-host setting section 112, a lexicon-defining section 113 and a multicast-address setting section 114.

The base-host setting section 111 defines as to which host among several host stores original data, or which host in a network stores a lexicon-set base (original). The backup-host setting section 112 provides one or more backup hosts to each base host while the system is running. The lexicon-defining section 113 decides lexicons that belong to a lexicon set defined by the base-host setting section 111. The multicast-address setting section 114 sets default multi-addresses as parameters for system startup or multi-addresses different from the default for each lexicon set.

(2) Transaction Manager 12A

The transaction manager 12A defines a transaction used by an application and also a transaction function executed by the transaction. It also defines the relationship between the transaction function and lexicons to be accessed by the transaction function.

(3) Transaction Processor 12B

On receiving a transaction-execution request from an application in accordance with settings done by the transaction manager 12A, the transaction processor 12B selects a transaction function corresponding to the requested transaction and performs looking-up, updating and searching procedure to data in lexicon sets by using the selected transaction function.

(4) Resident-data Manager 13

Figure 5:
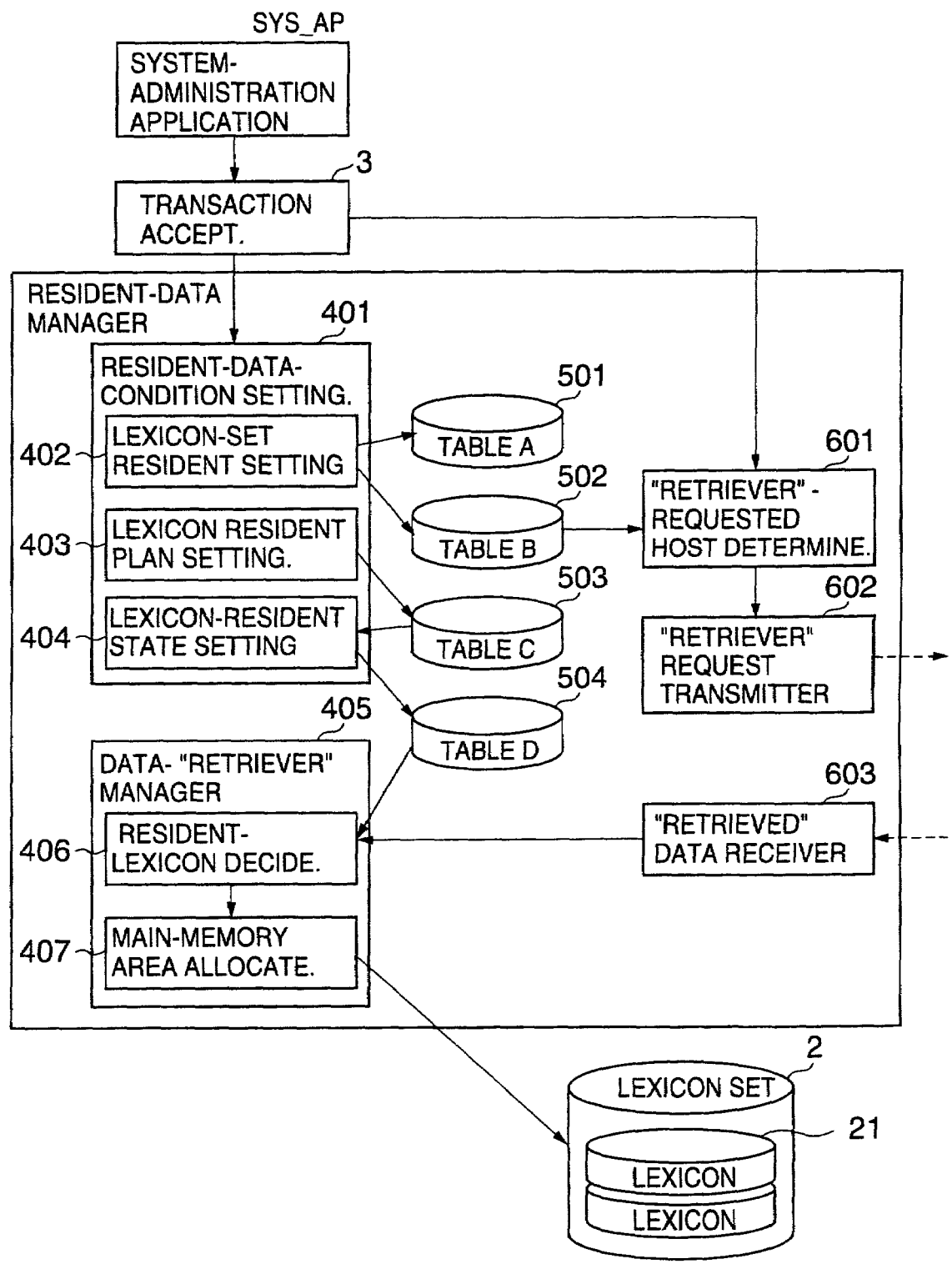
FIG. 5 is a block diagram of a resident-data manager 13 in the distributed-processing database-management system in FIG. 1.

The resident-data manager 13 performs settings as to which lexicon sets remain at each host, or which lexicon sets are accessible to business applications at each host. While the system is running, the resident-data manager 13 performs the function "retriever" for taking necessary data from a base host to replica sites and a resident-data state-changing procedure so that a new lexicon set remains resident at a specific host or a lexicon set having remained resident at a specific host is released therefrom. The resident-data manager 13 is shown in FIG. 5, which will be explained later.

(5) "Transcription" Processor 14

The "transcription" processor 14 performs the function "transcription" to maintain data uniformity between a base host and replica sites already set by the system-configuration setting section 11. In detail, a business application has access to data via transactions classified into "looking-up" only for looking up data and "updating" for data updating as explained in Definition of Technical Terms. Hosts for executing the transactions are classified into "local site", a self-site, and "remote sites", other sites.

The "transcription" processor 14 performs the following procedures explained in Definition of Technical Terms in accordance with those site types: (a) local looking-up, (b) local updating and (c) remote updating.

(6) Base-host Switching Processor 15

It is sometimes required to switch the base host for a lexicon set to another host while the system is running at the base host that has been set by the system-configuration setting section 11 for each lexicon set. This could happen due to host malfunction in a network, maintenance or network failure.

Hosts connected to the network are (a) a host that is currently the base host (old base host), (b) a host to possibly become the base host (new base host) in place of the old host and (c) other hosts.

The base-host switching processor 15 performs procedures to those three types of hosts such as transmission of original data from the base host to the new base host or the other hosts by the function "transcription" and informing hosts of which host has become a new host after host-switching.

Figure 3:
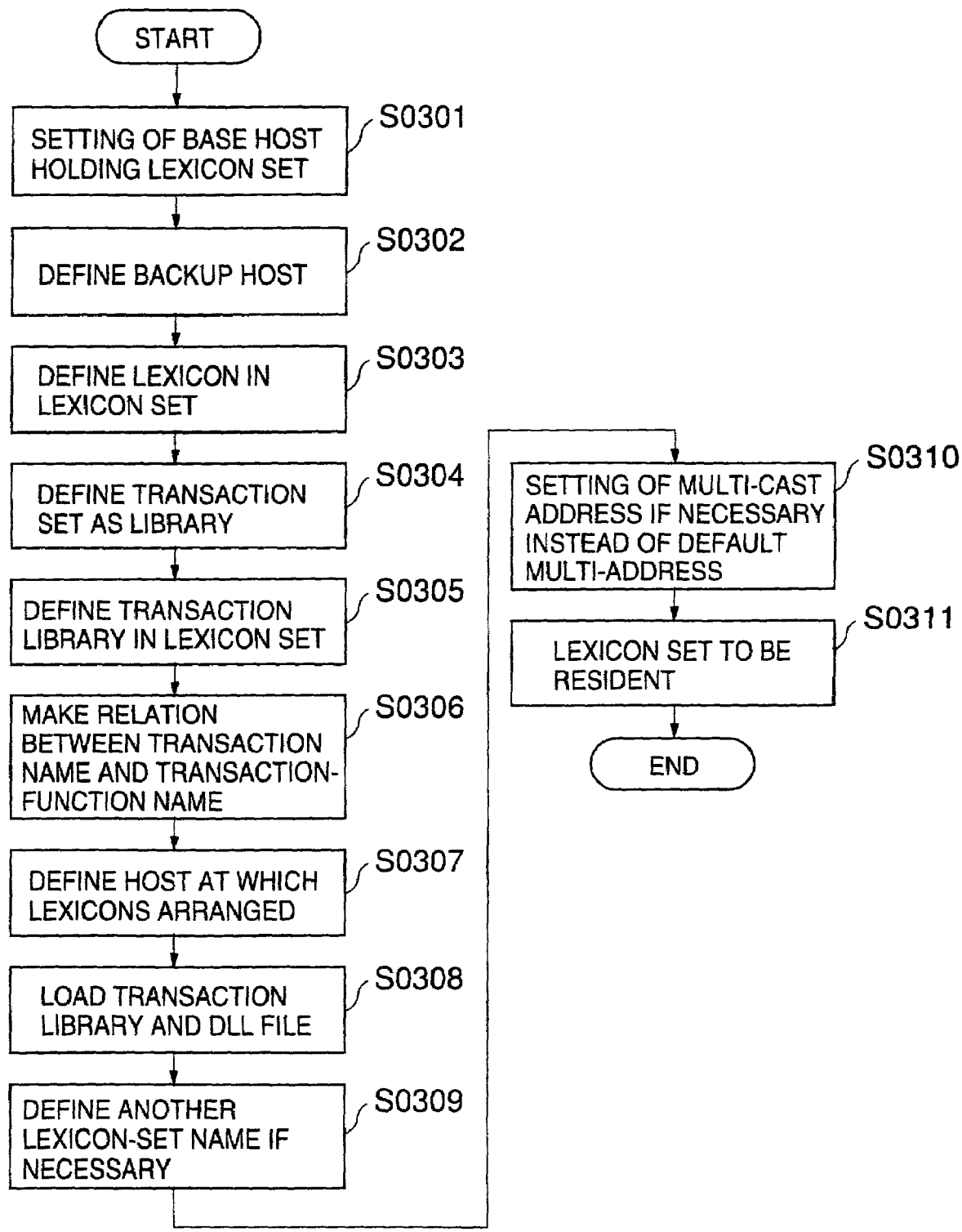
FIG. 3 is a flowchart showing a setting procedure for the distributed-processing database-management system in FIG. 1.

[4. System-Configuration Settings . . . FIG. 3]

Several types of settings as explained below are available in the present invention for each host shown in FIG. 2. Such settings are performed when a data-management system-setting transaction requested by a system-administration application accesses setting or processing sections.

The present system provides all of data related to data called lexicon sets and also transactions for processing these data in a main-memory area of each host. Therefore, several types of settings as explained below are performed under a requirement in that the main-memory area has been correctly initialized.

Several types of settings are performed to data provided in the initialized main-memory area to start the present system by using a specific system-administration application.

Registration and execution of transactions are performed by using different types of applications. An application for system settings such as registration of transactions is called "system-administration application", and that for transaction-execution requests is called "user-executed application" in this embodiment.

(1) Definition of Lexicon Set (S0301)

A user has to define lexicon sets decided at the time of designing. In detail, a transaction issued from the system-administration application is received by the transaction-accepting section 3. On receiving a command from the section 3, the base-host setting section 111 of the system-configuration setting section 11 shown in FIG. 2 appoints the host as the base host for holding lexicon sets. There is only one base host for holding a particular lexicon set in this invention.

The following example decides the name of a lexicon set to be defined in a main-memory area and which host among hosts in a network to be designated as the base (original) host holding the lexicon set to a main-memory area. For example, a lexicon set in the name of "SampleLexiconSet" is defined at the base host "host1", as follows:

DefineLexiconSet(&us,"SampleLexiconSet","host1");

This is just definition of a lexicon set and hence no instance for the lexicon-set data exists anywhere.

(2) Definition of Backup Host (S0302)

A user can define one or more backup hosts for each lexicon set at the backup-host setting section 112 of the system-configuration setting section 11 with a requirement that at least one backup host exists while the system is running. It is also decided at the backup-host setting section 112 whether to make a backup file at each backup host.

For example, host 1 and host 2 are defined as backup hosts for SampleLexiconSet, with making a backup file at the host 1 but not at the host 2, as follows:

SetLexiconSetBackupHost(&us,"SampleLexiconSet", "host1",T RUE);
SetLexiconSetBackupHost(&us,"SampleLexiconSet", "host2",F ALSE);

(3) Definition of Lexicon (S0303)

Next, the lexicon-defining section 113 defines lexicons in the lexicon set that has been defined as above, which belong to the lexicon set. Also defined is a type of each lexicon; single original or multi-original.

It is allowed to apply an updating procedure (cell/context formation, alteration, etc) to single-original-type lexicons at the base host for the lexicon set to which the single-original-type lexicons belong to. The results of the updating procedure are transmitted to other hosts by the function "transcription" so that their lexicon sets can reflect the updating procedure.

In contrast, it is allowed to apply such updating procedure to the multi-original-type lexicons at every host, the updated results being not be allowed to be transmitted to other hosts. In other words, the updated results will remain at a local host.

For example, two lexicons "Lexicon1" and "Lexicon2" are defined in "SampleLexiconSet", and "Lexicon1" and "Lexicon2" are defined as the single-original type and the multi-original type, respectively, as follows:

DefineLexiconInLexiconSet(&us,"SampleLexiconSet",
    "Lexicon1",SingleORG);
DefineLexiconInLexiconSet(&us,"SampleLexiconSet",
    "Lexicon2",MultiORG);

(4) Definition of Transaction Library (S0304, S0305)

Transaction functions and transactions have a one-to-one correspondence in the present system. The transaction processor 12 defines a set of transactions as a library and registers the transaction library in a lexicon set.

For example, a transaction library "TRLIB" is defined in "SampleLexiconSet" in which the library consists of three transactions "tr1", "tr2" and "tr3", as follows:
char *TrNames[3]
TrNames[0]="tr1";TrNames[1]="tr2"; TrNames[2]="tr3";
DefineTransactionLibrary(&us,samplelexiconSet",
    "TRLIB",3,TrNames);

There are just definitions of transactions, hence no executable transactions exist.

(5) Making of Relation between Transaction Names and Transaction-Function Names (S0306)

The transaction processor 12 makes a relation between transaction names and transaction-function names, and simultaneously, determines lexicons to be accessed by transactions and an access mode, the lexicons and the transactions related with each other being registered in a lexicon set.

The access mode is looking-up or updating. Transactions are only allowed to look up the contents of lexicons in the looking-up access mode, data updating being prohibited. On the contrary, transactions are allowed to look up and also update the contents of lexicons in the updating access mode.

For example, three transactions "tr1", "tr2" and "tr3" are made related (attached) to transaction functions "tr1all", "tr2srh" and "tr3upd", respectively, in which "tr1" updates lexicons "lexicon1" and "lexicon2", "tr2" only looks up "lexicon1", and "tr3" updates "lexicon1" but only looks up "lexicon2", as follows:
char *lex[2];
int mode[2];
lex[0]="lexicon1"; lex[1]="lexicon2";
mode[0]=TRUE; mode[1]=TRUE;
AttachTransactionToFunction(&us,SampleLexiconSet",
    "tr1", "tr1all,2,lex,mode);
lex[0]="Lexicon1";
mode[0]=FALSE;
AttachTransactionToFunction(&us,SampleLexiconSet",
    "tr2", "tr2srh,1,lex,mode);
lex[0]="Lexicon1"; lex[1]="Lexicon2";
mode[0]=TRUE; mode[1]=FALSE;
AttachTransactionToFunction(&us,SampleLexiconSet",
    "tr3", "tr3upd,2,lex,mode);

There are just the relations between the transaction names and the transaction-function names having been made, hence no transactions executable.

(6) Definition of Lexicon Arrangement (S0307)

The resident-data manager 13 defines hosts at which lexicons will be arranged. Arrangement of lexicons only required for transactions to run at each host mostly saves resources. Recommended is the same arrangement of lexicons over several hosts when their computers have enough capacity.

For example, an arrangement of lexicons "Lexicon1" and "Lexicon2" of a lexicon set "SampleLexiconSet" at a host "host1" is as follows:
DefineHostOfLexiconResidence(&us,"SampleLexiconSet",
    "Lex icon1", "host1");
DefineHostOfLexiconResidence(&us,"SampleLexiconSet",
    "Lex icon2", "host1");

There are just definitions of hosts at which the lexicons will be arranged, no lexicon data being set or no main memory area being prepared for storing lexicon data. Such data arrangements and main-memory area settings will be done after the lexicon-set data have remained at the host.

(7) Transaction Library and DLL-File Loading (S0308)

The transaction processor 12 makes a DLL file that is a library of transaction functions related to a transaction library and loads them onto a host that is holding lexicon sets while the present system is running at the host. Only the transactions that have been made related to transaction-function names are linked with transaction-function pointers at the time of loading.

The relations of all transactions to the transaction-function names are searched in the transaction library to find out the related transaction-function pointers by using the transaction-function names in the loaded DLL file, to link the transactions to the transaction-function pointers.

For example, a DLL file "c: ¥ gigabase ¥ trfunc.dll" is loaded onto a host "host1" for a transaction library "TRLIB" in which a file type is DLL, as follows:
LoadTransactionLibraryFile(&us,"SampleLexiconSet",
    "TRLIB","host1","c: ¥ gigabase ¥ trfunc.dll",DLL);

The transactions and the transaction-function pointers have been linked with each other at this stage. Execution of a transaction however requires the lexicon sets of the transaction to be executed being resident at a host for executing the transaction.

As disclosed above, the transaction functions have been loaded to the present system and relations of the transactions and the transaction functions have been made. Registration of the transactions to the present system as described above allows the transaction functions to run on the system, thus achieving operation of databases in the system.

(8) Definition of another Lexicon-Set Name (S0309)

The transaction processor 12 can execute a transaction with assignment of another lexicon-set name when initiated by an application. Another lexicon-set name is defined as alias before execution of a transaction. For example, another name "ALIAS" is defined for a lexicon set "SamleLexiconSet", as follows:
DefineLexiconSetAlias(&us,"SampleLexiconSet",
    "ALIAS";

Execution of a transaction initiated by an application can be done with "SampleLexiconSet" or "ALIAS". The system-administration application is, however, not allowed to use any another lexicon-set name.

(9) Multi-Cast Address Settings (S0310)

Communications on user-defined lexicon sets without this setting is performed at a default multi-cast address that has been set using system-start parameters. Instead, multi-cast address settings by the multi-cast address setting section 114 of the system-configuration setting section 11 allows such communications at a multi-cast address different from the default multi-cast address.

Communications on lexicon-set data at the set multi-cast address requires resident lexicon-set data after the multi-cast address settings. A multi-cast address will, however, not be altered during data communications when lexicon-set data has already been resident at a host before the multi-cast address settings. The resident lexicon-set data is once released and made resident again for the set multi-cast address to be effective.

For example, a multi-cast address 232.122.32.93 is set for "SamleLexiconSet", as follows:
unsigned int maddr;
maddr=(232<<24)+(122<<16)+(32<<8)+93;
SetMulticastAddressForlexiconSet(&us,"SamleLexiconSet",m addr);

(11) Lexicon Set to be Resident (S0311)

The resident-data manager 13 stores lexicon sets at each hosts so that the lexicon sets will remain there. Users are then allowed to load the data into a main-memory area for execution of transaction functions. This setting requires appointment of a host from which data is to be taken by the function "retriever". This appointed host is called a "retriever"-requested host.

The function of "retriever" for making lexicon sets resident at a host will not work while the present system is not running at the host, information on making the lexicon sets resident being just defined. The function "retriever" will work when the present system starts.

Lexicon-set data is taken by the function "retriever" when the present system has started. Once the function "retriever" for the lexicon-set data has been completed, a transaction that has been liked at this time is executable, and also a set multi-cast address is available. On starting of the function "retriever" for the lexicon-set, only lexicon-set for which arrangement has been defined at a host can be stored in the main-memory area.

Figure 4:
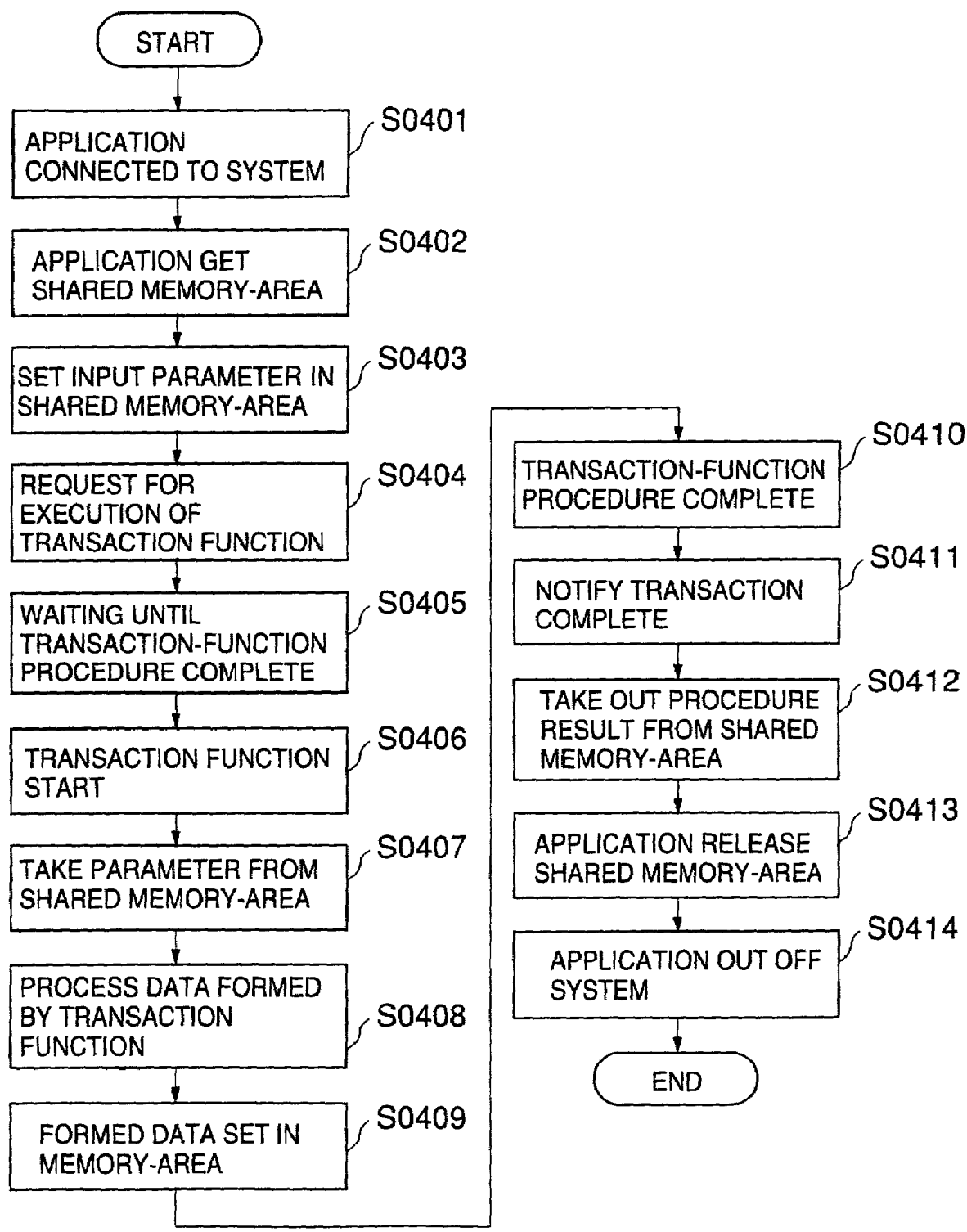
FIG. 4 is a flowchart showing procedures of executing applications and transactions for the distributed-processing database-management system in FIG. 1.

Arrangement of a lexicon set "SampleLexiconSet" at a host "host1" from "retriever"-requested hosts "host2" and "host3" is as follows:
char *rethost[2];
rethost[0]="host2"; rethost[1]="host3";
LoadlexiconSetData(&us,"SampleLexiconSet","host1",2, reho st);

[5. Application and Transaction Function Execution Procedure . . . FIG. 4]

FIG. 4 shows flowcharts for calling a transaction function from an application.

(1) Initially, an application is connected to the present system (S0401).

(2) The application gets a shared memory-area for data communications with the present system (S0403).

(3) The application sets input parameters in the shared memory-area, which will be sent to a transaction function (S0403).

(4) The application sends a transaction-execution request to the present system (S0404).

(5) The application enters a waiting mode until a transaction-function procedure is completed (S0405).

(6) On receiving the transaction-execution request, the present system starts the appointed transaction function (S0406). In detail, as shown in FIG. 4, when the application makes the transaction-execution request for a transaction corresponding to a procedure which is to be performed by the application, a transaction function having one-to-one correspondence with the transaction is selected and started.

(7) When the transaction function has stared, it takes out parameters, from the shared memory-area, necessary for the procedure to be performed by the application (S0407).

(8) The transaction function accesses a database for looking-up, searching, updating, deletion and addition, etc. The transaction-function procedure is then executed with the accessed data for forming necessary data for output (S0408). The transaction-function procedure is executed for the lexicons of a lexicon set already registered by the system-administration application.

(9) The transaction function sets the formed data in the shared memory-area (S0409).

(10) The transaction-function procedure is completed (S0411).

(11) On completion of the transaction-function procedure, the present system sends a transaction-completion notification to the application (S0411).

(12) On receiving the transaction-completion notification, the application takes out the results of the transaction-function procedure from the shared memory-area (S0412).

(13) The application releases the shared memory-area (S0413).

(14) The application cuts off the connection to the present system when the procedures have been completed and there is no requirement of accessing the present system (S0414).

(15) The application ends (END).

[6. Execution of Looking-Up Transaction and Updating Transaction]

In execution of the transaction procedures as disclosed above, the present system performs the following different procedures described below in accordance with the types of transactions requested by the user application, or accessing the database such as looking-up, searching, updating, deletion and addition in step S0408 (FIG. 4).

(1) Looking-Up Transaction

The transaction processor 12 executes this transaction to the lexicons to be accessed with no database updating. On completion of the looking-up transaction, the transaction processor 12 informs an application of the execution results. The looking-up transaction will only look up data with no updating, so that it can run at each site regardless of either original or replica data being remaining at the site.

(2) Updating Transaction

The updating-transaction procedure depends on whether data stored at a host that requests this transaction is original or replica data.

For the original data, like the looking-up transaction, the transaction processor 12 executes this transaction to the lexicons to be accessed and informs an application of the execution results.

In contrast, the updating transaction cannot directly update lexicons for the replica data. The transaction processor 12 at a replica site sends a request to the counterpart processor 12 at a base host via a network for execution of the updating transaction. The base-host transaction processor 12 executes the updating transaction stored at the base host for original-data updating. The updated original data is transmitted to replica sites by the function "transcription" so that replica-data can reflect changes in the original data due to updating. On completion this replica-data procedure, the updating transaction at each replica site informs the application of updated results.

[7. Transaction Settings]

The following several types of system settings are required for running the present system, which are usually performed by a program called a system-administration application:

(1) lexicon-set names and the base host (candidates after host switching) for storing each lexicon set;

(2) lexicons included in each lexicon set;

(3) a transaction libraries and transactions included in the libraries;

(4) transaction names and transaction functions for executing the transactions;

(5) lexicons to be accessed by each transaction and how to access (looking-up/updating);

(6) another name for a lexicon set, if necessary;

(7) multi-cast addresses for the function "transcription" to transmit lexicon sets to each host, if necessary;

(8) lexicon sets to be resident at each host;

(9) lexicons (included in the lexicon sets to be resident) to be set at each host;

(10) transaction libraries and their DLL-file name to be loaded to each host; and

(11) backup hosts for each lexicon set and file back-up necessary or not.

[8. Resident-Data Manager]

[8-1. Resident-Data Manager Architecture . . . FIG. 5]

An embodiment of the resident-data manager 13 for performing settings on making data to be resident at hosts will be disclosed with reference to a functional block shown in FIG. 5.

As disclosed in the architecture of each host with respect to FIG. 2, the resident-data manager 13 performs several settings for making data to be resident at hosts in a network in accordance with a data-management-system setting transaction requested from a system-administration application SYS_AP via the transaction-accepting section 3.

As shown in FIG. 5, the resident-data manager 13 is equipped with a resident-data-state setting section 401 for performing settings on the status of resident data at each host and a data-"retriever" manager 405 for taking data to be resident from the base host holding the data by the function "retriever" based on the status set by the resident data-state setting section 401.

The resident data-state setting section 401 has a lexicon-set resident setting section 402 that forms a lexicon set-to-"resident" host table 501 (TABLE A) that lists lexicon-set (LS) names and "resident" host names (LSR host names) at which the lexicon sets will remain, and also a "retriever"-requested host table 502 (TABLE A) that lists lexicon-set names, "resident" host names at which the lexicon sets will remain and "retriever" hosts used for making the lexicon sets be resident at the "resident" hosts.

The "retriever"-requested host table 502 allows listing lexicon-set names registered on the lexicon set-to-"resident" host table 501 to each "retriever" host that is also listed as a "resident" host.

A host at which lexicon sets will remain as resident data is called a "resident" host in this invention. Moreover, a host from which lexicon sets will be transmitted to a "resident" host by the function "retriever" is called a "retriever"(-requested) host in this invention.

Examples of the lexicon set-to-"resident" host table 501 and the "retriever"-requested host table 502 are shown below.

TABLE A

LEXICONSET-TO-"RESIDENT" HOST TABLE

| LS NAME | LSR HOST NAME |
|---|---|
| lexicon set A | host 1 |
| lexicon set A | host 2 |
| lexicon set B | host 1 |
| lexicon set C | host 2 |

TABLE B

"RETRIEVER"-REQUESTE HOST TABLE

| LS NAME | LSR HOST NAME | "RETRIEVER" HOST NAME |
|---|---|---|
| lexicon set A | host 1 | host 2, host 3, host 4 |
| lexicon set A | host 2 | host 1, host 3 |
| lexicon set B | host 1 | host 3, host 2, host 4 |
| lexicon set C | host 3 | host 2, host 3, host 4 |

The resident-data-state setting section 401 also has a lexicon-set resident plan setting section 403 for forming a lexicon set-to-"resident" host table 503 (TABLE C), and a lexicon resident-state setting section 404 for forming a lexicon resident-state table 504 (TABLE D) that will be formed at each host.

Examples of the lexicon set-to-"resident" host table 503 and the lexicon resident-state table 504 are shown below.

TABLE C

LEXICON-SET-TO-"RESIDENT" HOST TABLE

| LS NAME | LEX NAME | LSR HOST NAME |
|---|---|---|
| lexicon set A | lex 1 | host 1 |
| lexicon set A | lex 1 | host 2 |
| lexicon set A | lex 2 | host 1 |
| lexicon set B | lex P | host 1 |
| lexicon set B | lex P | host 2 |
| lexicon set C | lex C | host 3 |
| lexicon set C | lex D | host 3 |

TABLE D

LEXICON RESIDENT-STATE TABLE

| LS NAME | LEX NAME | RESIDENT OR NOT |
|---|---|---|
| lexicon set A | lex 1 | ○ |
| lexicon set A | lex 2 | X |
| lexicon set B | lex P | ○ |
| lexicon set C | lex C | X→○ |
| lexicon set C | lex D | X→○ |

The TABLE C lists lexicons to be resident at a host with lexicon (LEX) names and lexicon-set names, acting as a lexicon-to-be-resident planning table. The TABLE D is a list formed for each host with reference to the resident lexicon-to-"resident" host table, indicating whether a lexicon has been resident or not.

The TABLEs A to C are formed as a part of a system-administration lexicon set at a base host. Each TABLE (A to C) is transmitted by the function "retriever" to a host that has sent out a "retriever" request when it starts in accordance with the "retriever"-requested host list.

The resident-data manager 13 in this embodiment is also equipped with a "retriever"-requested host determining section 601 for determining a "retriever"-requested host for each lexicon set that has been set as "to be resident" at a self-host with reference to the TABLE B, so that the self-host sends a "retriever" request to another host for transmission of the lexicon set to the self-host, and a "retriever"-request transmitter 602 for transmitting the "retriever" request to the "retriever"-requested host.

The resident-data manager 13 is further equipped with a "retrieved"-data receiver 603 for receiving the "retrieved" data transmitted from the "retriever"-requested host.

The "retriever"-request transmitter 602 and the "retrieved"-data receiver 603 are connected to the transmitter 5 and the receiver 6, respectively, of the database-management apparatus 1 provided for each host, for communications with other hosts via the network.

As disclosed, the resident-data manager 13 in this embodiment has the data-"retriever" manager 405. The section 405 is equipped with a resident-lexicon deciding section 406 for determining whether or not storing each lexicon received from the "retrieved"-data receiver 603, as resident at the self-host, and also a main-memory area allocating section 407 for allocating a memory area as a main-memory area when a lexicon is determined as the one to be resident at the self-host.

[8-2. Operation of Resident-data Manager]

The following procedures are carried out at each host having the resident-data manager 13 in response to an execution request for the data-management system setting transaction from the system-administration application SYS_AP.

Figure 6:
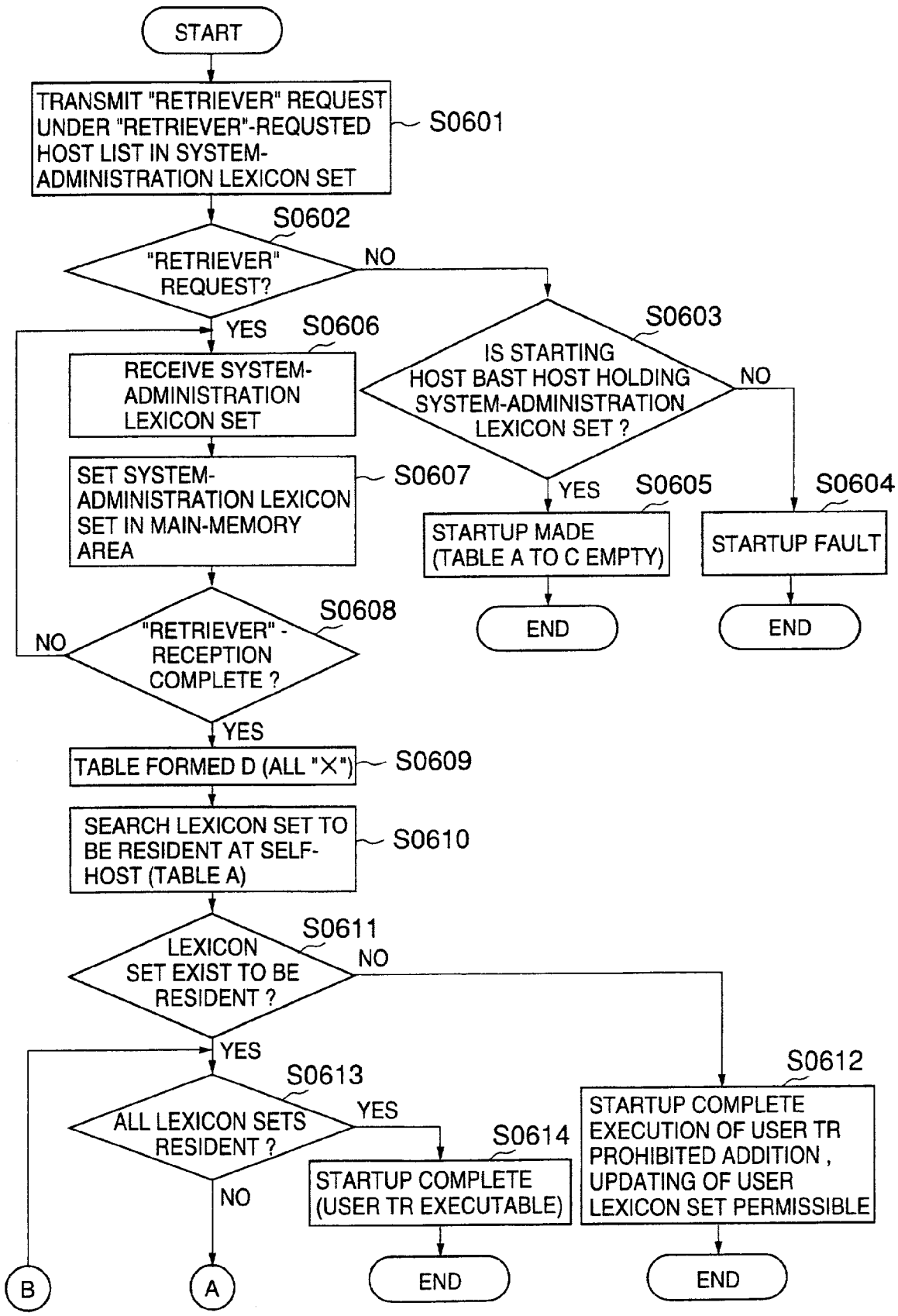
FIG. 6 is a flowchart showing the former part of a user startup procedure for the distributed-processing database-management system in FIG. 1.
Figure 7:
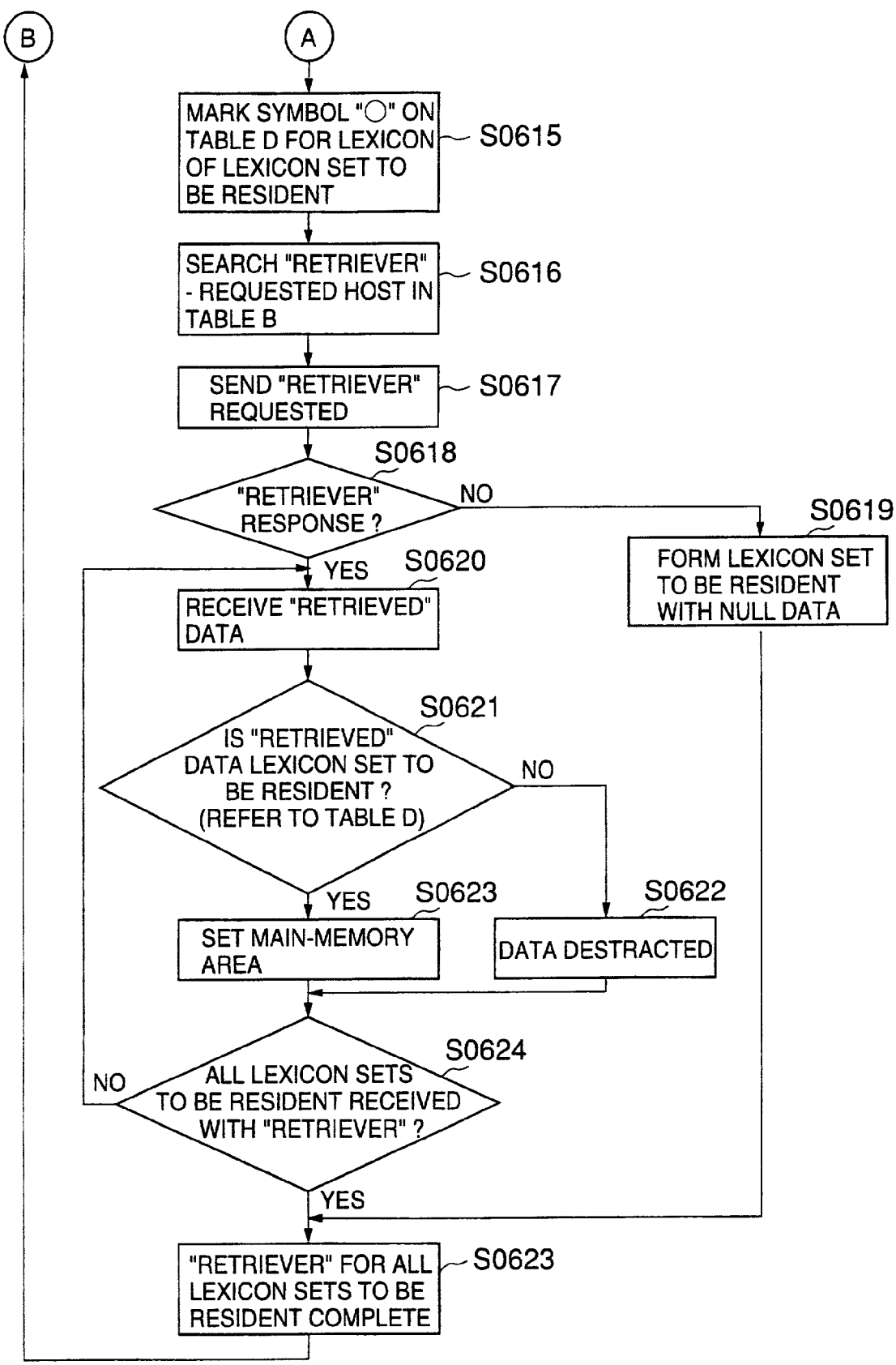
FIG. 7 is another flowchart showing the latter part of the user startup procedure, that follows the flowchart shown in FIG. 6.

[8-2-1. User Initial-Starting Procedure for the Present System . . . FIGS. 6, 7]

In FIG. 6, the "retriever"-requested host determining section 601 at a starting host determines a "retriever"-requested host under the "retriever"-requested host table 502 (TABLE B) and transmits a "retriever" request to the "retriever"-requested host via the "retriever"-request transmitter 602 (S0601).

It is determined whether there is a "retriever" response from the "retriever"-requested host to the "retriever" request (S0602). A "retriever" request is a request for the function of the "retriever". A "retriever" response is data transmission performed by the function "retriever". If no "retriever" response to the "retriever" request (NO in S0602), it is determined whether the starting host is the base host at which the system-administration lexicon set has been stored (S0603). The starting host is capable of running when it is the base host, even though there is no "retriever" response from other hosts to the "retriever" request. Determination is then made as to whether the starting host is the base host for possibility of no response.

When the starting host is not the base host (NO in S0603), there has been no "retriever" response to the "retriever" request even though another host is the base host. This is a startup fault for the starting host due to a possible malfunction (S0604), thus process ends.

On the contrary, when there has been no "retriever" response to the "retriever" request even though the starting host is the base host (YES in S0603), a startup has been made but the TABLEs A to C have remained empty (S0605).

When there is a "retriever" response to the "retriever" request from a "retriever"-requested host (YES in 0602), the system-administration lexicon set is received at the starting host by the function "retriever" (S0606), and the lexicon set is set in the main-memory area by the main-memory area allocating section 407 (S0607). The data reception by the function "retriever" and data set in the main-memory area will be repeated until reception of the system-administration lexicon set by the function "retriever" is completed (NO in S0608).

The system-administration lexicon set has only been stored as resident data at the starting host in this stage, no other user lexicon sets having been stored yet for data to be used by the application program. Received by the function "retriever" as the system-administration lexicon set are the resident lexicon set-to-"resident" host table (TABLE A) that indicates which lexicon sets will be resident at which hosts, the "retriever"-requested host table 502 (TABLE B) and the lexicon-to-"resident" host table (TABLE C) that indicates which lexicons of a lexicon set to be resident will be resident.

When the system-administration reception by the function "retriever" has been completed (S0608) after repetition of steps S0606 to S0608, the lexicon resident-state table 504 (TABLE D) is formed, which indicates the status of lexicons resident at each host (S0609). The lexicon resident-state table 504 lists lexicons that have been resident or non-resident at each host, which is different for several hosts. There is no lexicons resident at the starting host, so that the lexicon resident-state table 504 (TABLE D) contains data "X" (non-resident) only.

The self-host (starting host) searches lexicon sets to be resident at the self-host in accordance with the table 501 (S0610). For example, LexiconSet-A and LexiconSet-B are lexicon sets to be resident at the self-host when the self-host is the host 1 on the lexicon set-to-"resident" host table (TABLE A).

No existence of lexicons to be resident on the table 501 (NO in S0611) is followed by completion of startup at the self-host. This is a normal procedure in which the startup has been made, however, the user transactions are not allowed to run due to no resident lexicon sets (S0612). Addition and updating are allowed at the self-host to user lexicon sets resident at the self-host for user data.

On the contrary, user lexicon sets will be stored as resident data if there are in accordance with the TABLE A (YES in S0611). It is determined as to whether all lexicon sets have been resident (S0613). It is however, not completed yet when only the system-administration lexicon set has been resident, with no resident user lexicons (NO in S0613).

Repetition of the step S0615 and the succeeding steps allows the completion of startup at the self-host in which all the user lexicon sets listed on the table 501 have been resident (YES in S0613). The application program is now ready for executing user transactions to data included in the lexicon sets (S0614), which is the completion of the procedure for making data be resident.

Disclosed next with reference to FIG. 7 is the procedure of storing each lexicon set at each host as resident data when all lexicon sets have not been resident yet (NO in S0613) in FIG. 6.

A lexicon set to be resident first is selected among lexicon sets on the lexicon set-to-"resident" host table (TABLE A). The symbols "○" are marked on the lexicon resident-state table (TABLE D) for lexicons included in the selected lexicon set with reference to the lexicon-to-"resident" host table 503 (TABLE C) (S0615).

The lexicon-to-"resident" host table 503 (TABLE C) is a list of lexicons of each lexicon set and several hosts at which the lexicons will remain as resident data, which are called "resident" hosts. The table 503 is looked up and recording is made on the lexicon resident-state table 504 (TABLE D) about which lexicons are to be resident at a self-host.

For example, when the self-host is the host 1 on the lexicon-to-"resident" host table 503 (TABLE C), lexicons lex1 and lex2 of the lexicon set LexiconSet_A and lexP of LexiconSet_B are required to be resident at the host 1. For such a procedure for LexiconSet_A first, the symbol "○" is marked on the lexicon resident-state table (TABLE D) for the lexicons lex1 and lex2 (S0615).

"Retriever"-requested hosts (host2, host3, host4) are searched on the "retriever"-requested host table 502 (TABLE B) for the LexiconSet_A to be resident at the host1

(S0616). A "retriever" request is sent to each "retriever"-requested host (S0617). There are several protocols for "retriever"-request transmission and reception. For example, "retriever" requests may be sent to several "retriever"-requested hosts in a predetermined order. Or, a "retriever" request may be simultaneously sent to the "retriever"-requested hosts.

If no "retriever" response from all "retriever"-requested hosts to the "retriever" request (NO in 0618), lexicon sets to be resident are formed with null data (S0619). The procedure ends for the first lexicon set LexiconSet_A.

On the contrary, if there is a "retriever" response from any "retriever"-requested host (YES in 0618), "retrieved" data (LexiconSet_A) transmitted by the function "retriever" is received (S0620) at the self-site for determining whether or not lexicons included in the received data are the lexicon data to be resident that have been registered (the symbols "○" have been marked) on the lexicon resident-state table 504 (TABLE D) (S0621). The received data is destracted if not matching the lexicons to be resident (S0622). On the other hand, if there is a match, a main-memory area is set for the received data by the main-memory area allocating section 407 (S0623).

After that received "retrieved" data have been resident at the self-host, it is determined whether or not all lexicon sets to be resident have been received with the function "retriever" (S0624). If not complete (NO in S0624), the procedure returns to step S0620 for repetition of reception of next "retrieved" data. When complete for all retrieved data (YES in S0624), it is determined that all lexicon sets to be resident have been received with the function "retriever" (S0625), the procedure returns to step S0613 (FIG. 6).

After that all data of the first lexicon set (LexiconSet_A) have been resident at the host 1, the step S0615 and the succeeding steps are repeated for the lexicon set (LexiconSet_B), next to be resident, registered on the table 501 (TABLE A), followed by the same procedure for all lexicon sets on the table 501. When all lexicon sets have been resident at the self-host (YES in S0613), the startup for the self-host is completed (S0614) in FIG. 6.

Figure 8:
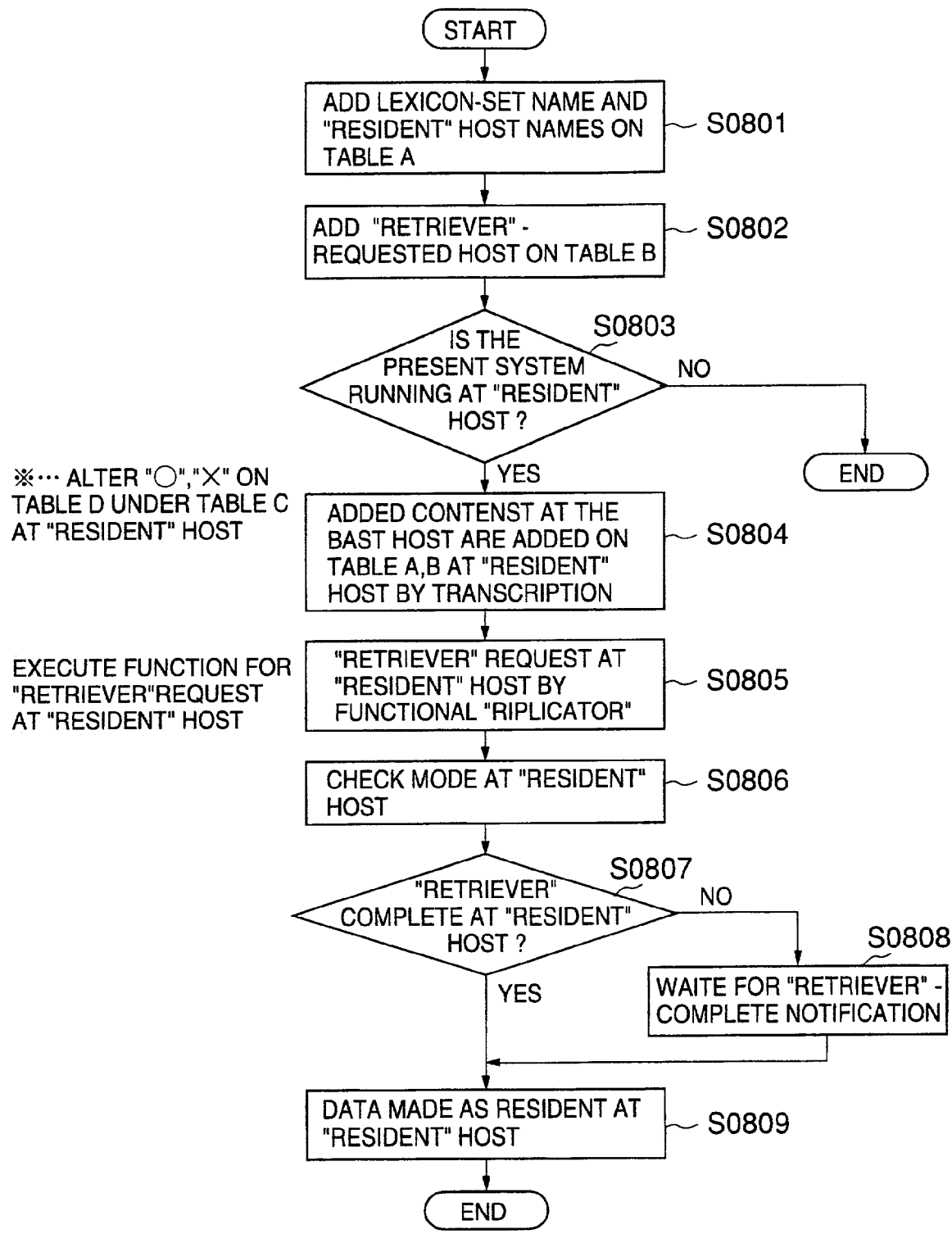
FIG. 8 is a flowchart showing an addition-settings procedure at the base host holding the system-administration lexicon.

[8-2-2. Addition-Settings at Base Host Holding System-Administration Lexicon Set . . . FIG. 8]

The present system is allowed to add new lexicon sets to be resident at each running host after the startup having been made. The addition-settings are available at the base host for holding the system-administration lexicon set and also at other "resident" hosts at which new lexicon sets will be added.

The addition-settings at the base host for holding the system-administration lexicon set is disclosed with respect to FIG. 8.

Firstly, lexicon-set names and "resident" host names at which the lexicon-sets will be resident are added on the table 501 (TABLE A) at the base host (S0801). "Retriever"-requested hosts for the "resident" hosts newly added on the table 501 (TABLE A) to take lexicon sets are added to the "retriever"-requested host table 502 (TABLE B) (S0802).

It is determined at the base host whether the present system is running at the "resident" hosts added to the table 501 (TABLE A) (S0803). If it is running, the added contents on the table 501 (TABLE A) and the table 502 (TABLE B) at the base host are added further to the table 501 (TABLE A) and the table 502 (TABLE B) at each host at which the lexicon sets will be resident by the function "transcription".

The lexicon-to-"resident" host table 503 (TABLE C) is formed previously at the base host and then formed at each host (including the "resident" hosts by the function "transcription". The symbols "○" are marked on the lexicon resident-state table 504 (TABLE D) for the lexicons of the lexicon sets to be added based on the table 503 (TABLE C) at the "resident" hosts.

A "retriever" request is made at each "resident" host by functional "transcription" from the base host. In detail, each "resident" host makes a "retriever" request for addition of lexicon sets to be resident to the "retriever"-requested hosts listed on the table 502 (TABLE B) (S0805) like the steps S0616 and S0617 in FIG. 7. This is followed by the step S0618 and the succeeding steps in FIG. 7, for storing the added lexicon sets at each "resident" host as resident data.

The base host holding the system-administration lexicon set checks the modes of the "resident" host at which the lexicon-sets will remain (S0806), and determines whether or not the function "retriever" has been performed at the "resident" hosts. If it is still being performed (NO in S0807), the base host is in a waiting mode for a "retriever"-completed notification. If it has been performed (YES in S0807), it is determined that lexicon sets to be added and lexicons to be added and included in the lexicon sets have remain at the "resident" hosts without failure (S0809). The addition-settings at the base host ends. The procedure can go to the step S0809 if no "retriever"-complete notification arrives even though a predetermined period has passed.

Figure 9:
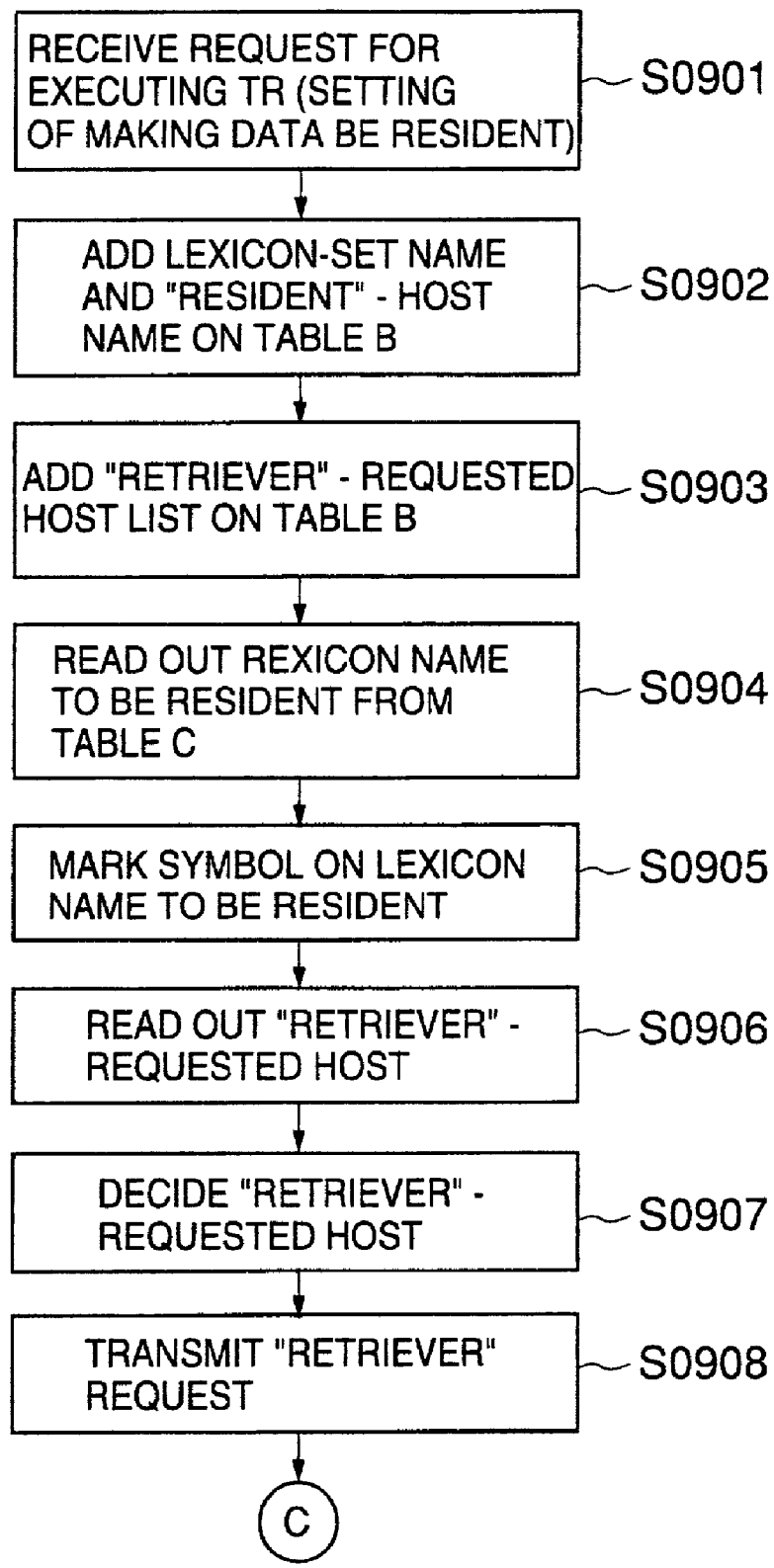
FIG. 9 is a flowchart showing the former part of an addition-settings procedure at a host different from the base host, for adding lexicon sets to be resident at the host.
Figure 10:
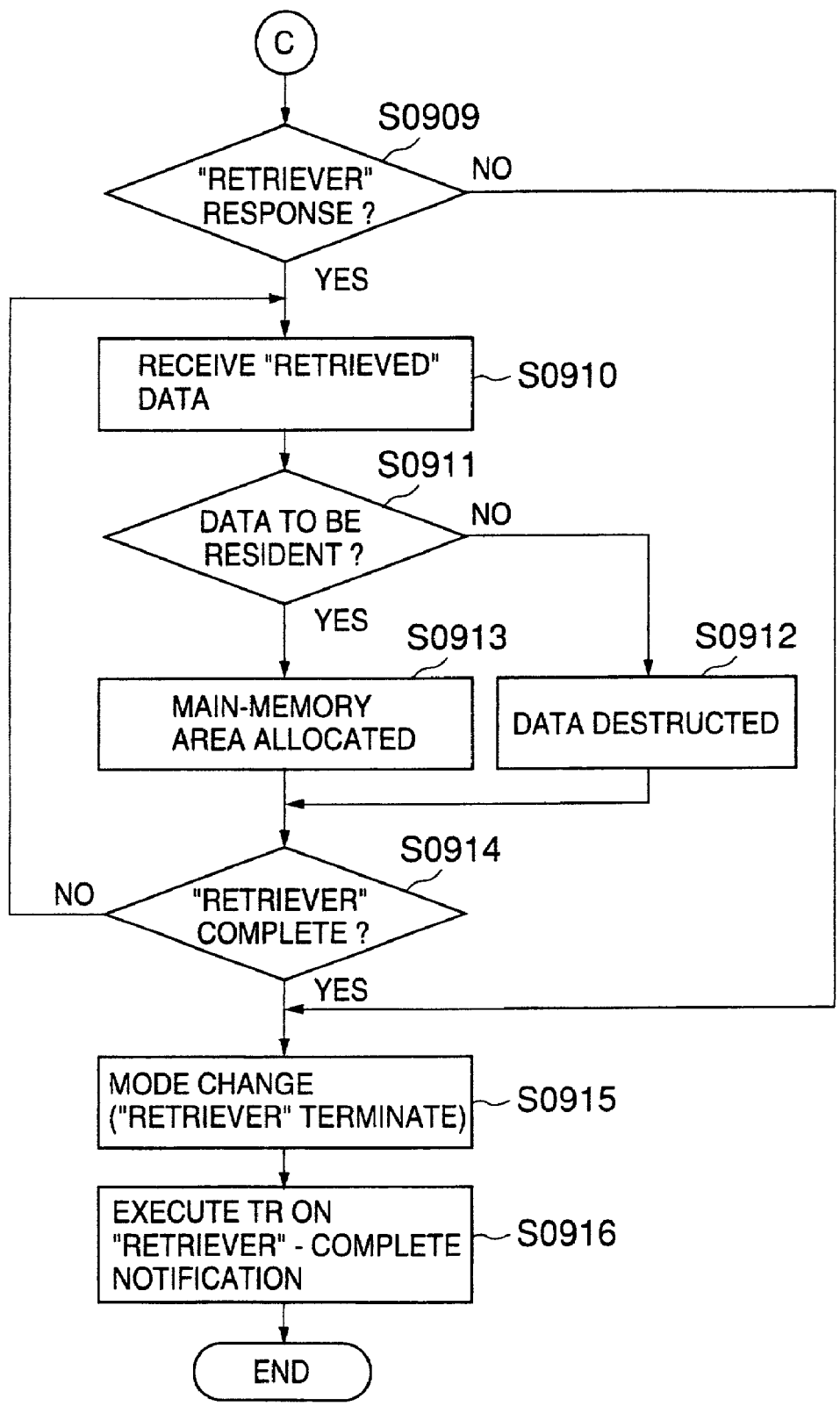
FIG. 10 is another flowchart showing the latter part of the addition-settings procedure, that follows the flowchart shown in FIG. 9.

[8-2-3. Addition-Settings at "Resident" Host . . . FIGS. 9, 10]

Disclosed next is addition-settings for adding lexicon sets to be resident at a "resident" host which is not the base host holding the system-administration lexicon set.

On receiving an addition-setting request to lexicon sets to be resident (S0901), a "resident" host adds a lexicon-set name and a "resident"-host name (own name) to its lexicon-to-"resident" host table 501 (TABLE A) (S0902). The "resident" host also adds a "retriever"-requested host list for the added lexicon sets to be resident to the "retriever"-requested host table 502 (TABLE B) (S0903). The addition on the tables 501 and 502 (TABLES A and B) is achieved by remote transaction in which the actual addition is done on the tables 501 and 502 (TABLES A and B) held at the base host and the addition results are transmitted to the "resident" host by the function "transcription". The lexicon-to-"resident" host table 503 (TABLE C) has been prepared as a list indicating which lexicons will be set at which hosts.

The tables 501, 502 and 503 (TABLES A, B, C) can be transmitted from the base host holding the system-administration lexicon set to other hosts by the function "transcription" for maintaining the same information on the lexicon sets and lexicons to be resident over several hosts.

After the tables 501, 502 and 503 (TABLES A, B, C) have been prepared as above, the lexicons names to be resident are read out from the lexicon-to-"resident" host table 503 (TABLE C) (S0904), and the symbols "○" are marked for the lexicons on the lexicon resident-state table 504 (TABLE D) that indicates whether the lexicons have been resident (S0905). The "retriever"-requested hosts for the added lexicon sets to be resident are searched (S0906), the "resident" host transmits a "retriever" request to each "retriever"-requested host (S0907, S0908).

No "retriever" response to the "retriever" request (NO in S0909) terminates the function "retriever" (S0915), which is assumed as the failure of addition-settings.

On the contrary, if receiving a "retriever" response from any "retriever"-requested host (YES in S0909), the "resident" host receives the "retrieved" data (data transmitted by the function "retriever" (S0910), and determines whether or not lexicons included in the "retrieved" data are the lexicon data to be resident and registered with the symbols "○" on the lexicon-resident state table (TABLE D) (S0911). If the received data are not the lexicons to be resident, the data are destructed (S0912), whereas if they are, the data are set in a main-memory area by the main-memory area allocating section 407 (S0913).

After the "retrieved" data have been resident as above, it is determined whether all lexicon sets to be resident have been resident by the function "retriever" (S0914), the procedure returns to the step S0910 for repeating the reception of "retrieved" data and the process of making them as resident data.

When the function "retriever" has completed (YES in S0914), it terminates for the lexicon sets to be resident (S0915). The "retriever" mode is switched to a usual application mode, with issuing a "retriever"-terminated notification transaction to an application program (S0916).

Figure 11:
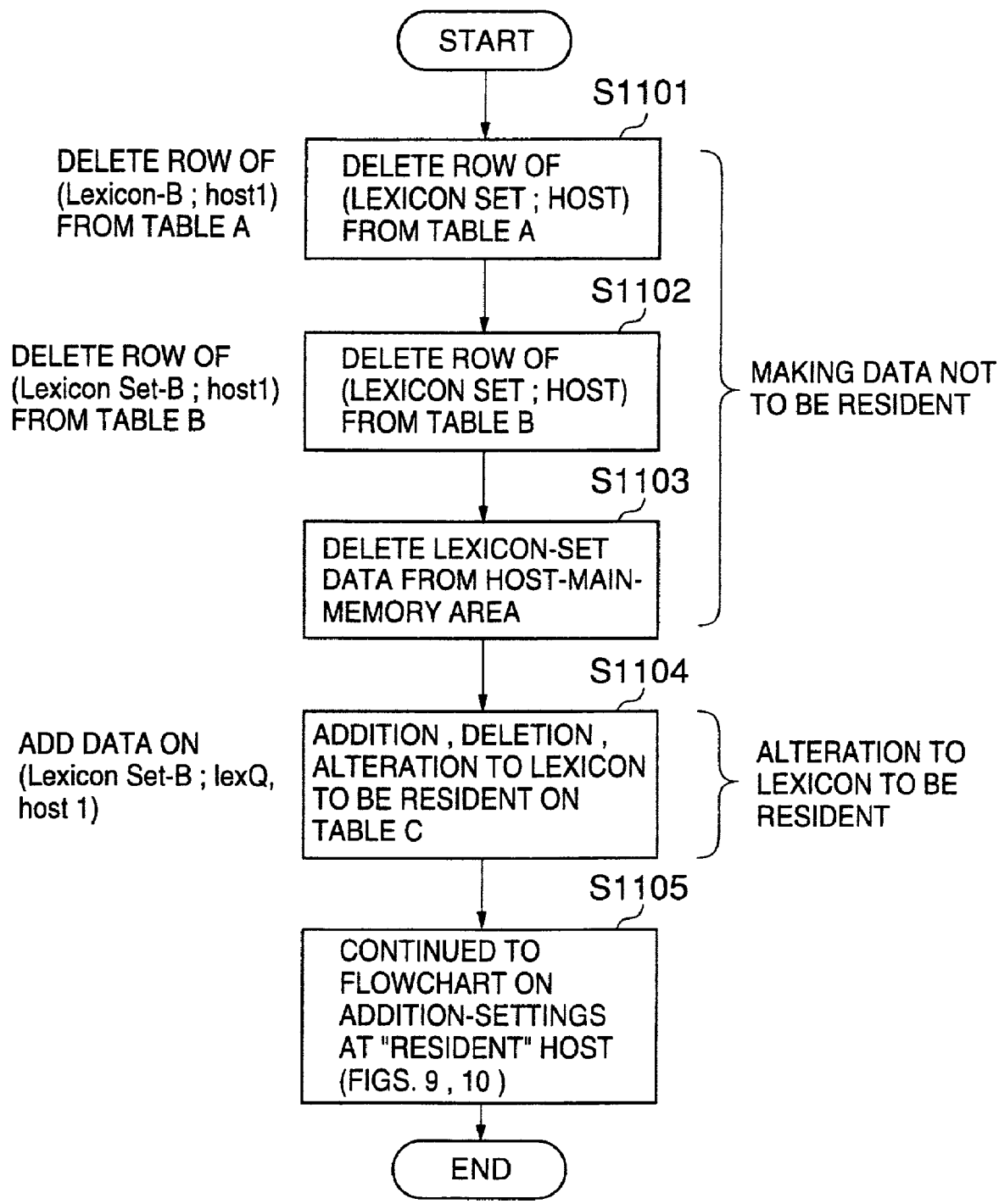
FIG. 11 is a flowchart showing a procedure of alteration to resident lexicons.

[8-2-4. Resident-Lexicon Alteration . . . FIG. 11]

The resident-data manager 13 in this embodiment can alter the status of lexicon sets to be resident and the lexicons included in the lexicon sets, in addition to addition-settings to lexicons to be newly resident as disclose above.

Disclosed with reference to FIG. 11 is an alteration procedure for addition of a lexicon lexQ to be resident in a lexicon set LexiconSet_B at a host 1.

The row (LexiconSet_B, host1) for a "resident" host at which a lexicon set will remain is deleted from the table 501 (TABLE A) (S01101). Also deleted from the table 502 (TABLE B) is the row (LexiconSet_B, host1) (S01102). The deletion on the tables 501 and 502 (TABLES A, B) is achieved by remote transaction in which the actual deletion is done on the tables 501 and 502 (TABLES A and B) held at the base host holding the system-administration lexicon set and the deletetion results are transmitted to the "resident" host by the function "transcription".

Data on LexiconSet_B to be resident is deleted from the main-memory area at the "resident" host (S1103). Addition, deletion or alteration (addition of data on LexiconSet_B, lexQ, host1 on the lexicon-to-"resident" host table 503, in this case) to a lexicon to be resident is performed on the table 503 (TABLE C).

The formation of new lexicon-to-"resident" host table 503 (TABLE C) and the deletion of a lexicon set to be resident before alteration from the main-memory area are followed by additional registration of new lexicon set, a "resident" host at which the new lexicon set will remain and "retriever"-requested hosts on the tables 501 and 502 (TABLES A, B). These sequential procedures are followed by the same procedure for the addition-settings at a "resident" host disclosed with reference to FIGS. 9 and 10.

The embodiment according to the present invention disclosed so far is advantageous as follows:

(1) Replica data is transmitted from the base host to several hosts by the function "retriever" so that it remains at each host at the system startup. The function "retriever" allows use of data at the hosts identical to the original data located at the base host, the data being available for the hosts as their own data with no relation to the location of the original data.

(2) The function "retriever" is performed per lexicon set of data to each host even if the data are different over several hosts. The function "retriever" per lexicon set is simpler than a function "retriever" per data, or lexicon. Moreover, the function "retriever" is performed per lexicon set, a group of data while data to be resident are limited to the lexicons to be used by applications, thus achieving efficient use of main-memory area for the data to be resident.

(3) Information on data to be resident and required for the function "retriever" is previously set as a system-administration lexicon set at the base host. The information is then transmitted to other hosts by the function "retriever" at the startup of each host. This allows the identical system-administration lexicon set to be provided over several hosts, which enables the same procedure for data to be resident over several hosts, thus maintaining system matching.

(4) Data addition, deletion or alteration at the base host holding the system-administration lexicon set after other hosts have been running allows replica data at each host to reflect changes due to data modification at the base host. This enables resident-data uniformity over several hosts even after data have remained at each host.

(5) The resident-data state setting section and the "retrieved" data manager achieve previous settings of hosts at which data will remain, data contents, and the location of original data of data to be resident at hosts, which allow data to be resident at the hosts smoothly.

(6) The distributed network system having the resident-data manager 13 in this embodiment achieves the independence of application software from computer hardware, with the remote/local architecture that does not rely on the system hardware. This architecture allows applications to run with no relation to the system physical architecture such as hardware physical architecture, the location of computers in which data are installed and data matching. System engineers can therefore focus on logic design and installation, for developments of enhanced systems.

[9. Modifications]

(1) In the embodiment, the function "retriever" is performed per lexicon set and the data-remaining procedure is performed per lexicon of each lexicon set so that data will remain at hosts. The function "retriever" and the data-remaining procedure both may, however, be performed per lexicon set or lexicon.

(2) A particular computer may not be designated as the base host for holding the system-administration lexicon set. In other words, the system-administration application may be set at each host so that an authorized system manager can alter the system-administration lexicon set from any host. This modification allows transmission of an updated system-administration lexicon set to a running host by the function "transcription" and thereafter to other hosts that have started by the function "retriever". It is thus achieved that a host at which the updated system-administration lexicon set has been formed is designated as the base host holing the system-administration lexicon set.

(3) In the embodiment, several settings for the data-remaining procedure are preformed in accordance with system-setting-use transactions issued from the system-administration application, each transaction being executed by calling transaction functions. The transactions may, however, be executed in such a way that the present system interprets and executes data-operation procedure stated in each transaction under a specific protocol.

(4) Each transaction includes identifiers (transaction name, etc) for assignment of several attributes. For example, a transaction function to be executed is set as having a relation to each attribute. The number of identifiers may depend on types of attributes to be assigned.

Each transaction can operate only one lexicon set. In the embodiment, the uni-space can include several lexicon sets, so that each transaction has a lexicon-set name to be operated. The lexicon-set name may be used as an identifier, which is however not a must. Instead of lexicon-set name, another identifier can be used for determining a lexicon-set name to be operated.

(5) The embodiment is disclosed with "several machines" which are physically different machines and the communications network which is a communications means for the machines, including physical media. Not only that, the "several machines" may be logically different machines such as different processes in a machine, with different means (process ID, etc) of distinguishing the logically different machines from each other. The present system can manage one or more of databases (lexicon sets).

(6) The communications network for transmitting data by the function "transcription" and that for transferring transactions may be physically/logically the same or different from each other. A multi-cast/broadcast network is efficient for data transmission over a lot of replica hosts. The present invention is, however, not limited to such network. Transaction transfer is usually performed by one-to-one communications. The multi-cast/broadcast network may also used for such transfer under the requirements that transactions received by sites that are not allowed to execute the transactions be deleted or not be executed under determination of such sites.

As disclosed above, the present invention provides a distributed-processing database-management system having the following advantages:

(1) Flexibility with Remote/Local Architecture

The distributed-processing system according to the present invention does not depend on the system hardware called remote/local architecture. Application software in this invention requires no hardware installation, so that software development can be proceeded as independent of system construction. Coding processing is not required for system construction. System construction/settings can be done under system-running environments.

(2) Network-Used Enhanced Reliabilities

The functional features of the present invention lie in redundant functions and data-recovery function. These functions achieve quick system-recovery procedures in which data are loaded from backup files in the event of system initialization or failure.

The present invention allows the base host holding the system-administration lexicon set to set data that will remain at each host, so that the base host can manage data at several hosts in a network.

All data are not required to remain at each host. In other words, the present invention allows only necessary data to remain at each host, for efficient use of main-memory area at each host. Resident-data setting alteration can be performed not only at the base host holding the system-administration lexicon but also other hosts at which data will remain. This data-setting alteration can quickly follow alteration to transactions to be executed at each host.

(3) Functional Alteration with no System Halt

The data-management system according to the present invention can alter data remaining at a self-host anytime, which actively follows data-structure alteration. These alterations can be done with no system halt, thus the present invention achieving easy system-setting alteration procedures.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of managing a database stored in each main-memory area of a plurality of computers connected via a network, the database including at least one lexicon set configured to have at least one lexicon, the method comprising:

designating a first computer storing original data of data of the database as an original site;

designating a second computer storing replica data of the original data as a replica site;

performing a retriever function to receive data to be stored in a third computer from the original site storing the original data or the replica site storing the replica data on startup of the third computer, and to store the received data in the main-memory of the third computer, the retriever function being performed by the lexicon set;

setting a list data configured to include the lexicon set and the lexicon to be stored in each computer, the original site storing original data of the lexicon set, and sites to which each computer is to make a request for performing the retriever function for each computer;

storing the list data as original data of a system-administration lexicon set in an original site of the system-administration lexicon set; and transmitting the system-administration lexicon set to the third computer in startup of the third computer from the original site of the system-administration lexicon set or a replica site storing replica data of the system-administration lexicon set.

2. The method of managing a database according to claim 1, further comprising:

deciding at least one site to which a request for performing the retriever function is to be made from a list data of the lexicon set and the lexicon to be stored in each computer, an original site storing original data of the lexicon set, and sites to which each computer is to make the request, the list being registered in the original site, storing a system-administration lexicon set;

determining whether there is a response from the decided site;

if no response, determining whether a computer that is making the request is the original site storing the system-administration lexicon set;

when the computer that is making the request is the original site, making resident data of the list at the computer that is making the request whereas forming a null system-administration lexicon set at the computer that is making the request if no data exists in the system-administration lexicon set.

3. The method of managing a database according to claim 1, further comprising a transcription procedure to maintain uniformity between the original data at the original site and the replica data at the replica site when all data have been resident in the main-memory area of each computer, and when alteration has been made to the resident data.

4. The method of managing a database according to claim 3, wherein when a predetermined data is resident at each computer and each computer is running, further comprising:

updating data in the system-administration lexicon set at the original site; and transmitting the updated data in the system-administration lexicon set to each computer to add data to be resident at each computer.

5. The method of managing a database according to claim 3, wherein when predetermined data is resident at each computer and each computer is running, further comprising:
  requesting the original site for altering the original data of data of the system-administration lexicon set from the replica site storing the replica data of the system-administration lexicon set;
  transmitting the altered data from the original site to each computer to maintain uniformity of information on data to be resident at each computer.

6. A computer readable medium containing an executable program for managing databases including at least one lexicon set configured to have at least one lexicon, the program comprising instructions for;
  designating a first computer storing original data of data of a database stored in each main-memory area of a plurality of computers connected via a network, as an original site;
  designating a second computer storing replica data of the original data as a replica site;
  performing a retriever function to receive data to be stored in a third computer from the original site storing the original data or the replica site storing the replica data on startup of the third computer, and to store the received data in the main-memory of the third computer, the retriever function being performed by the lexicon set;
  setting a list data configured to include the lexicon set and the lexicon to be stored in each computer, an original site storing original data of the lexicon set, and sites to which each computer is to make a request for performing the retriever for each computer;
  a storing the list data as original data of a system-administration lexicon set in an original site of the system-administration lexicon set; and
  transmitting the system-administration lexicon set to the third computer in startup of the third computer from the original site of the system-administration lexicon set or a replica site storing the replica data of the system-administration lexicon set.

7. The computer readable medium containing an executable program according to claim 6, further comprising instructions for:
  deciding at least one host to which a request for performing the retriever function is to be made from a list data of the lexicon set and the lexicon to be stored in each computer, an original site storing original data of the lexicon set, and sites to which each computer is to make the request, set at each computer, the list being registered in the original site, storing a system-administration lexicon set;
  determining whether there is a response from the decided site;
  if no response, determining whether a computer that is making the request is the original site storing the system-administration lexicon set;
  when the computer that is making the request is the original site, making resident data of the list at the computer that is making the request whereas forming a null system-administration lexicon set at the computer that is making the request if no data exists in the system-administration lexicon set.

8. The computer readable medium containing an executable program according to claim 6, further comprising instructions for a transcription procedure to maintain uniformity between the original data at the original site and the replica data at the replica site when all data have been resident in the main-memory area of each computer, and when alteration has been made to the resident data.

9. The computer readable medium containing an executable program according to claim 8, wherein when a predetermined data is resident at each computer and each computer is running, further comprising instructions for:
  updating data in the system-administration lexicon set at the original site; and
  transmitting the updated data in the system-administration lexicon set to each computer to add data to be resident at each computer.

10. The computer readable medium containing an executable program according to claim 8, wherein when predetermined data is resident at each computer and each computer is running, further comprising instructions for: requesting the original site for altering the original data of the system-administration lexicon set from the replica site storing the replica data of the system-administration lexicon set;
  transmitting the altered data from the original site to each computer to maintain uniformity of information on data to be resident at each computer.

11. A database-management system comprising:
  at least two computers connected via a network, the computers having main-memory areas storing databases, each database including at least one lexicon set configured to have at least one lexicon as a unit of data to be processed, either of the computers being designated as an original site for storing the original of the data, the other computer being designated as a replica site for storing replica of the data, each computer including:
  a resident-data-state setter configured to set a list of at least one computer at which the data is to be resident, the original site storing the original data of the data, and at least one site to which the computer at which the data is to be resident makes a request for a retriever function, the retriever function being performed by the lexicon set; and
  a retrieved-data manager configured to transmit the request to the one site in accordance with the setting performed by the resident-data-state setter, the data being transmitted to the computer that is making the request from the original site or the replica site by the retriever function,
  wherein the resident-data-state setter includes:
  a lexicon-set resident setter configured to set a list of at least one lexicon-set name to be accessed, at least one computer name at which the lexicon set of the data is to be resident, and a retrieving-site name to be used for making the data resident at the one computer;
  a lexicon resident-plan setter configured to set the lexicon to be resident at each computer and the lexicon set; and
  a lexicon resident-status setter configured to determine whether a lexicon is resident at each computer in accordance with the setting performed by the lexicon-set resident setter.

12. The database-management system according to claim 11, further including a transcription processor configured to maintain uniformity between the original data at the original site and the replica data at the replica site when all data have been resident in the main-memory area of each computer, and when alteration has been made to the resident data.

13. The database-management system according to claim 11, wherein a list of the lexicon set and the lexicon to be resident at each computer, the original site storing the original data of the lexicon set, and at least one site to which each computer makes a request for the retriever function is set per computer, the set data being stored at an original site as original data of a system-administration lexicon set, in startup of each computer, the system-administration lexicon set being transmitted to each computer from the original site storing the original data of the system-administration lexicon set or a replica site storing replica data of the system-administration lexicon set.

14. The database-management system according to claim 13, wherein when predetermined data is resident at each computer and each computer is running, data in the system-administration lexicon set is updated at the original site storing the original data of the system-administration lexicon set, and the updated data in the system-administration lexicon set is transmitted by the transcription processor to each computer.

15. The database-management system according to claim 13, wherein when predetermined data is resident at each computer and each computer is running, data of the system-administration lexicon set is updated at a computer different from the original site storing the original data of the system-administration lexicon set, the updated data being transmitted to the original site storing the original data of the system-administration lexicon set by the transcription processor, the updated data being further transmitted from the original site to each computer to maintain uniformity of information on the lexicon set and lexicon to be resident at each computer.

* * * * *